(12) United States Patent
Umaya et al.

(10) Patent No.: US 11,060,424 B2
(45) Date of Patent: Jul. 13, 2021

(54) SOLAR THERMAL POWER GENERATION FACILITY

(71) Applicant: Mitsubishi Hitachi Power Systems, Ltd., Yokohama (JP)

(72) Inventors: Masahide Umaya, Yokohama (JP); Masato Ota, Yokohama (JP); Naoyuki Nagafuchi, Yokohama (JP); Tadaharu Kishibe, Yokohama (JP); Takahiro Marumoto, Yokohama (JP); Masato Kurita, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 3 days.

(21) Appl. No.: 16/629,450

(22) PCT Filed: Jul. 4, 2018

(86) PCT No.: PCT/JP2018/025336
§ 371 (c)(1),
(2) Date: Jan. 8, 2020

(87) PCT Pub. No.: WO2019/013066
PCT Pub. Date: Jan. 17, 2019

(65) Prior Publication Data
US 2020/0182094 A1 Jun. 11, 2020

(30) Foreign Application Priority Data

Jul. 12, 2017 (JP) .............................. JP2017-136191

(51) Int. Cl.
*F01K 23/08* (2006.01)
*F01K 23/10* (2006.01)
(Continued)

(52) U.S. Cl.
CPC ............ *F01K 23/108* (2013.01); *F01K 23/10* (2013.01); *F02C 1/05* (2013.01); *F02C 6/18* (2013.01);
(Continued)

(58) Field of Classification Search
CPC . F01K 23/08; F01K 23/10; F02C 1/05; F03G 6/064; F03G 6/067; F24S 90/00
See application file for complete search history.

(56) References Cited

U.S. PATENT DOCUMENTS

2011/0127773 A1* 6/2011 Freund .................... F01K 23/10
290/52
2011/0233940 A1* 9/2011 Aoyama ................. F01K 23/10
290/1 R
(Continued)

FOREIGN PATENT DOCUMENTS

DE 3037574 A1 7/1982
JP 2000-161013 A 6/2000
(Continued)

OTHER PUBLICATIONS

International Search Report dated Sep. 4, 2018, issue in counterpart Application No. PCT/JP2018/025336, with English translation. (4 pages).
Written Opinion dated Sep. 4, 2018, issued in counterpart Application No. PCT/JP2018/025336, with English translation. (19 pages).

*Primary Examiner* — Shafiq Mian
(74) *Attorney, Agent, or Firm* — Westerman, Hattori, Daniels & Adrian, LLP

(57) ABSTRACT

Provided is a solar thermal power generation facility that includes: a compressor; a medium heating heat receiver that receives sunlight and heats a compressed medium from the compressor; a turbine that is driven by the compressed medium heated by the medium heating heat receiver; a power generator that generates electric power by driving of (Continued)

the turbine; and a tower that supports these components. The compressor, the turbine, and the power generator are formed as arranged devices. A plurality of the arranged devices are aligned in a vertical direction.

15 Claims, 7 Drawing Sheets

(51) Int. Cl.
    *F02C 1/05*     (2006.01)
    *F24S 90/00*     (2018.01)
    *F02C 6/18*     (2006.01)
    *F02C 7/20*     (2006.01)
    *F03G 6/06*     (2006.01)

(52) U.S. Cl.
    CPC ................ *F02C 7/20* (2013.01); *F03G 6/064* (2013.01); *F03G 6/067* (2013.01); *F24S 90/00* (2018.05)

(56) References Cited

U.S. PATENT DOCUMENTS

| | | | |
|---|---|---|---|
| 2012/0111025 A1* | 5/2012 | Gericke | ............. F02C 1/06 60/805 |
| 2013/0081395 A1 | 4/2013 | Frey et al. | |
| 2014/0102073 A1 | 4/2014 | Pang et al. | |
| 2019/0323384 A1* | 10/2019 | Uechi | ............. F01K 7/22 |

FOREIGN PATENT DOCUMENTS

| | | |
|---|---|---|
| JP | 2012-047086 A | 3/2012 |
| JP | 2012-092835 A | 5/2012 |
| JP | 2012-140872 A | 7/2012 |
| JP | 2012-202390 A | 10/2012 |
| JP | 2013-076401 A | 4/2013 |
| JP | 2013-133766 A | 7/2013 |
| JP | 2014-001641 A | 1/2014 |
| JP | 2014-080975 A | 5/2014 |
| WO | 2010/147003 A1 | 12/2010 |
| WO | 2014/068797 A1 | 5/2014 |

* cited by examiner

SOLAR THERMAL POWER GENERATION FACILITY

TECHNICAL FIELD

The present invention relates to a solar thermal power generation facility that generates electric power with thermal energy obtained from sunlight.

Priority is claimed on Japanese Patent Application No. 2017-136191, filed Jul. 12, 2017, the contents of which are incorporated herein by reference.

BACKGROUND ART

In recent years, facilities using thermal energy obtained by concentrating sunlight as environment-friendly clean energy have been actively developed.

An example of such a facility is, for instance, a solar thermal power generation facility described in Patent Literature 1 below. The solar thermal power generation facility includes a compressor that compresses air as a working medium to generate compressed air, a heat receiver that receives sunlight to heat the compressed air, a heliostat that applies the sunlight to the heat receiver, a turbine that is driven by the compressed air heated by the heat receiver, and a power generator that generates electric power by driving of the turbine. All of the compressor, the heat receiver, the turbine, and the power generator are provided on a tower. The compressor, the turbine, and the power generator are provided in a highest stage of the tower which is higher than a position at which the heat receiver is provided. Rotors of the compressor, the turbine, and the power generator extend in the horizontal direction. The compressor, the turbine, and the power generator are disposed in the highest stage of the tower side by side in the horizontal direction.

CITATION LIST

Patent Literature

[Patent Literature 1]
Japanese Unexamined Patent Application, First Publication No. 2012-202390

SUMMARY OF INVENTION

Technical Problem

In the solar thermal power generation facility described in Patent Literature 1 above, since the compressor, the turbine, and the power generator are disposed in the highest stage of the tower side by side in the horizontal direction, there is a problem that two-dimensional spreading of the tower increases and an area occupied by the tower increases. Further, in the technology described in Patent Literature 1 above, since the compressor, the turbine, and the power generator, which are heavy objects, are disposed in the highest stage of the tower, and are disposed such that rotary shafts thereof extend in the horizontal direction, there is a need to enhance the strength of structural members constituting the tower, and there is a problem that installation costs of the tower increases.

Therefore, the present invention is directed to providing a solar thermal power generation facility capable of reducing an area occupied by a tower and reducing installation costs of the tower.

Solution to Problem

An aspect of a solar thermal power generation facility according to the invention to achieve the above object includes: a compressor that compresses a working medium to generate a compressed medium; a medium heating heat receiver that is a heat receiver and receives sunlight to heat the compressed medium; a turbine configured to be driven by the compressed medium heated by the medium heating heat receiver; a power generator that generate electric power by driving the turbine; and a tower that supports the compressor, the medium heating heat receiver, the turbine, and the power generator. The compressor has a compressor rotor that is rotated about a compressor axis extending in a vertical direction, and a compressor casing that covers the compressor rotor. The turbine has a turbine rotor that is rotated about a turbine axis extending in the vertical direction, and a turbine casing that covers the turbine rotor. The compressor rotor and the turbine rotor are mechanically connected to constitute a gas turbine rotor. The power generator has a power generator rotor that is mechanically connected to each other to the gas turbine rotor and is rotated about a power generator axis extending in the vertical direction, and a power generator casing that covers the power generator rotor. The compressor, the turbine, and the power generator are formed as arranged devices. A plurality of the arranged devices are aligned in the vertical direction.

In the present aspect, the plurality of arranged devices are aligned in the vertical direction. For this reason, in the present aspect, an area occupied by the tower can be reduced, strength required of structural members constituting the tower can be reduced, and installation costs of the tower can be reduced.

Here, in the solar thermal power generation facility of the above aspect, the medium heating heat receiver may be disposed within a range from a region in which the compressor is disposed in the vertical direction to a region in which the turbine is disposed in the vertical direction.

In the present aspect, a length of a piping system (hereinafter, referred to as a line) that guides the medium heated by the medium heating heat receiver into the turbine casing can be shortened, and heat dissipation from the line can be curbed.

Further, the solar thermal power generation facility of any of the above aspects may include hanging wires, each of which has a first end and a second end, wire support machines that support loads applied to the hanging wires, and winding machines to which the second ends of the hanging wires are connected and which wind the hanging wires. The first ends of the hanging wires may be connected to any one of the compressor casing, the turbine casing, and the power generator casing. The wire support machines may be supported on the tower at positions above one of the casings. Each of the wire support machines may receive a portion between the first end and the second end of each of the hanging wires.

In the present aspect, when the turbine, the exhausted heat recovery boiler, the compressor, the steam turbine, and the power generator are inspected or repaired, a winding amount of each of the hanging wires wound around the winding machines is gradually reduced, and the devices are lowered downward and are demounted in turn. Thereby, the devices can be relatively easily inspected or repaired.

In the solar thermal power generation facility of any of the above aspects, the compressor casing may have an inlet into which the working medium flows, and the turbine casing may have an outlet that discharges the working medium that is the compressed medium. In this case, the solar thermal power generation facility may include a circulatory line configured to guide the working medium, which is discharged from the outlet of the turbine casing, from the inlet of the compressor casing into the compressor casing.

In the present aspect, since the compressor draws in the working medium exhausted from the turbine, a temperature of the working medium which the compressor draws in becomes higher, compared to a case where the compressor draws in outside air acting as the working medium. Furthermore, in the present aspect, since the compressor draws in the working medium exhausted from the turbine, a pressure of the working medium which the compressor draws in can become higher, compared to a case where the compressor draws in outside air acting as the working medium.

Accordingly, in the present aspect, a high-temperature and high-pressure working medium can be supplied to the turbine, compared to the case the compressor draws in outside air. For this reason, in the present aspect, output of the gas turbine can be enhanced, compared to the case in which the compressor draws in outside air. Further, in the present aspect, the compressor draws in a high-temperature working medium exhausted from the turbine, and thus release of the high-temperature working medium exhausted from the turbine into the atmosphere can be curbed. For this reason, in the present aspect, a heat island phenomenon, which is at issue at present and is caused by, for instance, exhausted heat from an outdoor unit for building air-conditioning, can be curbed.

The solar thermal power generation facility of any of the above aspects may include an exhausted heat recovery boiler that heats water with the exhausted medium that is the working medium exhausted from the turbine and converts the water into steam.

In the aspect, heat of the exhausted medium exhausted from the turbine can be effectively used.

In the solar thermal power generation facility of the aspect which includes the exhausted heat recovery boiler, the compressor casing may have an inlet into which the working medium flows, and the exhausted heat recovery boiler may have a discharge port that discharges the working medium that is the exhausted medium. In this case, the solar thermal power generation facility may include a circulatory line configured to guide the working medium, which is discharged from the discharge port of the exhausted heat recovery boiler, from the inlet of the compressor casing into the compressor casing.

In the present aspect, since the compressor draws in the working medium exhausted from the exhausted heat recovery boiler, a temperature of the working medium which the compressor draws in becomes higher, compared to a case where the compressor draws in outside air acting as the working medium. Furthermore, in the present aspect, since the compressor draws in the working medium exhausted from the exhausted heat recovery boiler, a pressure of the working medium which the compressor draws in can become higher, compared to a case where the compressor draws in outside air acting as the working medium.

Accordingly, in the aspect, a high-temperature and high-pressure working medium can be supplied to the turbine, compared to the case the compressor draws in the outside air. For this reason, in the present aspect, output of the gas turbine can be enhanced, compared to the case the compressor draws in the outside air. Further, in the present aspect, the compressor draws in a high-temperature working medium exhausted from the exhausted heat recovery boiler, and thus release of the high-temperature working medium exhausted from the exhausted heat recovery boiler into the atmosphere can be curbed. For this reason, in the present aspect, a heat island phenomenon, which is at issue at present and is caused by, for instance, exhausted heat from an outdoor unit for building air-conditioning, can be curbed.

The solar thermal power generation facility of any of the above aspects which includes the circulatory line may include a pressure regulating mechanism that is provided on the circulatory line and regulates a pressure inside the circulatory line.

In the present aspect, the pressure of the working medium flowing into the compressor can be regulated. For this reason, in the present aspect, a temperature region in which a phase of the working medium becomes a gas phase can be widened, for instance, by regulating the pressure of the working medium.

In the solar thermal power generation facility of any of the above aspects which includes the exhausted heat recovery boiler, the exhausted heat recovery boiler may be formed as an arranged device, and a plurality of arranged devices including the exhausted heat recovery boiler may be aligned in the vertical direction.

In the aspect, although the exhausted heat recovery boiler is added, a plurality of arranged devices including the exhausted heat recovery boiler are aligned in the vertical direction, and thus an increase in the area occupied by the tower can be curbed.

In the solar thermal power generation facility of any of the above aspects which includes the exhausted heat recovery boiler, the exhausted heat recovery boiler may have a medium preheater that exchanges heat between the compressed medium from the compressor and the exhausted medium and heats the compressed medium.

In the present aspect, the compressed medium from the compressor is heated by heat of the exhausted medium. For this reason, the compressed medium can reach a high temperature, compared to a case where the compressed medium is heated only by the medium heating heat receiver.

The solar thermal power generation facility of any of the above aspects which includes the exhausted heat recovery boiler may include: a steam turbine configured to be driven by steam from the exhausted heat recovery boiler; a steam condenser configured to return steam exhausted from the steam turbine to water; and a feed line configured to guide water inside the steam condenser to the exhausted heat recovery boiler.

In the present aspect, the steam turbine can also be driven.

In the solar thermal power generation facility of the aspect which includes the steam turbine, the steam turbine may have a steam turbine rotor that is rotated about a steam turbine axis extending in the vertical direction, and a steam turbine casing that covers the steam turbine rotor, the steam turbine may be formed as an arranged device, and a plurality of arranged devices including the steam turbine may be aligned in the vertical direction.

In the aspect, although the steam turbine is added, a plurality of arranged devices including the steam turbine are aligned in the vertical direction, and thus an increase in the area occupied the tower can be curbed.

In the solar thermal power generation facility of the aspect in which the steam turbine is formed as an arranged device, the steam turbine rotor may be mechanically connected to the power generator rotor, and the solar thermal power generation facility may include a clutch configured to switch a connection state between the gas turbine rotor and the power generator rotor, between a transmission state in which motive power transmission is possible and a non-transmission state in which motive power transmission is not performed between the gas turbine rotor and the power generator rotor.

In the present aspect, electric power can be generated in the power generator by driving of the steam turbine. Further, in the present aspect, the steam turbine rotor can be rotated without rotating the gas turbine rotor.

In the solar thermal power generation facility of the aspect which includes the clutch, the compressor and the turbine may be disposed on one of an upper side in the vertical direction and a lower side in the vertical direction with respect to the power generator, the steam turbine may be disposed on the other of the upper side in the vertical direction and the lower side in the vertical direction with respect to the power generator, and the solar thermal power generation facility may include a clutch configured to switch a connection state between the steam turbine rotor and the power generator rotor between a transmission state in which motive power transmission is possible and a non-transmission state in which motive power transmission is not performed between the steam turbine rotor and the power generator rotor.

In the present aspect, without rotating the steam turbine, the gas turbine rotor can be rotated, and the power generator rotor can be rotated. Furthermore, in the present aspect, without rotating the gas turbine rotor, the steam turbine rotor can be rotated, and the power generator rotor can be rotated.

In the solar thermal power generation facility of any of the above aspects which includes the steam turbine, the steam condenser may have a water storage in which, after the steam exhausted from the steam turbine is returned to the water, the water is capable of being stored, the water storage may be formed as an arranged device, and a plurality of arranged devices including the water storage may be aligned in the vertical direction.

In the present aspect, although the steam condenser is added, a plurality of arranged devices including the water storage of the steam condenser are aligned in the vertical direction, and thus an increase in the area occupied by the tower can be curbed.

In the solar thermal power generation facility of the aspect in which the water storage is formed as an arranged device, the water storage of the plurality of arranged devices may be disposed at the lowest position.

In the present aspect, since the water storage of the steam condenser that can become the heaviest object during an operation among the plurality of devices constituting the solar thermal power generation facility is disposed at the lowest position, an increase in strength required of the structural members constituting the tower can be curbed.

In the solar thermal power generation facility of the aspect in which the water storage is disposed at the lowest position, the steam turbine may be disposed below the compressor and the turbine.

In the present aspect, among the plurality of devices constituting the solar thermal power generation facility, a distance between the steam condenser in which the water storage is disposed at the lowest position and the steam turbine can be made shorter than a distance between the compressor or the turbine and the steam condenser.

In the solar thermal power generation facility of any of the above aspects which includes the steam turbine, the turbine may be disposed above the compressor, and the exhausted heat recovery boiler may be disposed above the turbine.

Among the turbine, the compressor, and the exhausted heat recovery boiler, the exhausted heat recovery boiler is lightest. For this reason, in the present aspect, the exhausted heat recovery boiler is disposed at the highest position, and thus an increase in strength required of the structural members constituting the tower can be curbed. Further, the exhausted medium exhausted from the turbine has a high temperature, and thus moves up due to natural convection. For this reason, the exhausted heat recovery boiler is disposed above the turbine, and thus the exhausted medium can be efficiently guided to the exhausted heat recovery boiler.

The solar thermal power generation facility of any of the above aspects which includes the steam turbine may include a steam superheating heat receiver that is a heat receiver that receives sunlight and superheats steam sent from the exhausted heat recovery boiler to the steam turbine, and the steam superheating heat receiver may be supported on the tower.

In the present aspect, since the steam sent from the exhausted heat recovery boiler to the steam turbine can be superheated by the steam superheating heat receiver, a temperature of the steam supplied to the steam turbine can be raised.

The solar thermal power generation facility of any of the above aspects which includes the steam turbine may include a fed water preheating heat receiver that is a heat receiver that receives sunlight and heats water flowing along the feed line, and the fed water preheating heat receiver may be supported on the tower.

In the present aspect, since the water flowing along the feed line can be heated by the fed water preheating heat receiver, a temperature of water supplied to an exhausted heat recovery boiler can be raised.

The solar thermal power generation facility of any of the above aspects which includes the steam turbine may include a heat accumulation material that is capable of accumulating heat of steam from the exhausted heat recovery boiler.

Even if a temperature of the steam from the exhausted heat recovery boiler varies due to a change in weather, a temperature of the steam flowing into the steam turbine can be stabilized by a flow of heat between the steam from the exhausted heat recovery boiler and the heat accumulation material.

In the solar thermal power generation facility of the aspect which includes the heat accumulation material, a part of the feed line may be in contact with the heat accumulation material.

In the present aspect, the water flowing along the feed line can be heated by heat which the heat accumulation material accumulates.

The solar thermal power generation facility of any of the above aspects which includes the steam turbine may include: a heat accumulation material that is capable of accumulating heat of the steam from the exhausted heat recovery boiler; an auxiliary feed line that branches off from the feed line; a steam generator that is connected to the auxiliary feed line, has a heat transfer pipe that is in contact with the heat accumulation material and is capable of exchanging heat between the water from the auxiliary feed line and the heat accumulation material, is configured to heat the water with the heat accumulation material, and is configured to convert the water into steam; and an auxiliary steam line configured to guide the steam generated by the steam generator to the steam turbine.

In the present aspect, since the steam can be generated by the heat accumulated in the heat accumulation material, even when the sun does not shine, steam can be supplied to the steam turbine.

In the solar thermal power generation facility of any of the above aspects which includes the heat accumulation material, the heat accumulation material may have fluidity and include a heat accumulator, and the heat accumulator may have a heat transfer pipe along which a thermal medium flows, and a heat accumulation casing that accommodates the heat accumulation material and the heat transfer pipe.

The solar thermal power generation facility of any of the above aspects which includes the steam turbine may include: a heat accumulator has a heat accumulation material that is capable of accumulating heat of the steam from the exhausted heat recovery boiler and has fluidity; an auxiliary feed line that branches off from the feed line; a steam generator that is connected to the auxiliary feed line, is configured to heat the water from the auxiliary feed line, and is configured to convert the water into steam; an auxiliary steam line configured to guide the steam generated by the steam generator to the steam turbine; and a heat-accumulation-material supply line which connects the heat accumulator and the steam generator to each other and along which the heat accumulation material from the heat accumulator is capable of flowing. The heat accumulator may have a steam heat transfer pipe along which the steam from the exhausted heat recovery boiler is capable of flowing, and a heat accumulation casing that accommodates the heat accumulation material and the steam heat transfer pipe, and the steam generator may have a heat-accumulation-material heat transfer pipe that is connected to the heat-accumulation-material supply line and along which the heat accumulation material from the heat-accumulation-material supply line is capable of flowing, and a steam generation casing that is connected to the auxiliary feed line, is configured to collect water from the auxiliary feed line, and covers the heat-accumulation-material heat transfer pipe.

In the present aspect, since the steam can be generated by the heat accumulated in the heat accumulation material, even when the sun does not shine, steam can be supplied to the steam turbine.

In the solar thermal power generation facility of any of the above aspects which includes the heat accumulator, the heat accumulator may be formed as an arranged device, and a plurality of arranged devices including the heat accumulator may be aligned in the vertical direction.

In the present aspect, although the heat accumulator is added, a plurality of arranged devices including the heat accumulator are aligned in the vertical direction, and thus an increase in the area occupied by the tower can be curbed.

In the solar thermal power generation facility of the aspect in which the heat accumulator is formed as an arranged device, the heat accumulator may have a first heat accumulator and a second heat accumulator, and the first heat accumulator and the second heat accumulator may be aligned in the vertical direction.

The solar thermal power generation facility of any of the above aspects which includes the circulatory line may include a low boiling point medium having a lower evaporating temperature than air as the working medium.

In the present aspect, although a turbine outlet temperature of the working medium is the same as a case where air is used as the working medium, a pressure inside the circulatory line is regulated, and thus a temperature range in which a phase of the working medium becomes a gas phase can be widened. Accordingly, when energy is obtained from the working medium of the gas phase, an energy difference can be increased in the present aspect, compared to the case where air is used as the working medium. For this reason, in the present aspect, the output of the gas turbine can be enhanced, compared to the case where air is used as the working medium.

In the solar thermal power generation facility of any of the above aspects which includes the heat accumulation material, the tower may have a plurality of structures for supporting the arranged devices, and one of the plurality of structures may be formed of the heat accumulation material.

In the present aspect, since the components of the tower are partly formed of the heat accumulation material, miniaturization of the facility and a reduction in installation costs can be achieved, compared to a case where the heat accumulator having the heat accumulation material is separately provided.

In the solar thermal power generation facility of the aspect in which the single structure of the tower is formed of the heat accumulation material, the heat accumulation material may include concrete.

The solar thermal power generation facility of any of the above aspects may include heliostats, each of which has a reflector that reflects sunlight and a mirror driving machine that changes a direction of the reflector such that the sunlight reflected by the reflector is directed to the heat receiver.

Advantageous Effects of Invention

According to an aspect of the present invention, an area occupied by a tower can be reduced, and installation costs of the tower can be reduced.

DESCRIPTION OF EMBODIMENTS

Hereinafter, various embodiments of a solar thermal power generation facility according to the present invention will be described in detail with reference to the drawings.

First Embodiment

A first embodiment of the solar thermal power generation facility will be described with reference to FIG. 1.

Figure 1:
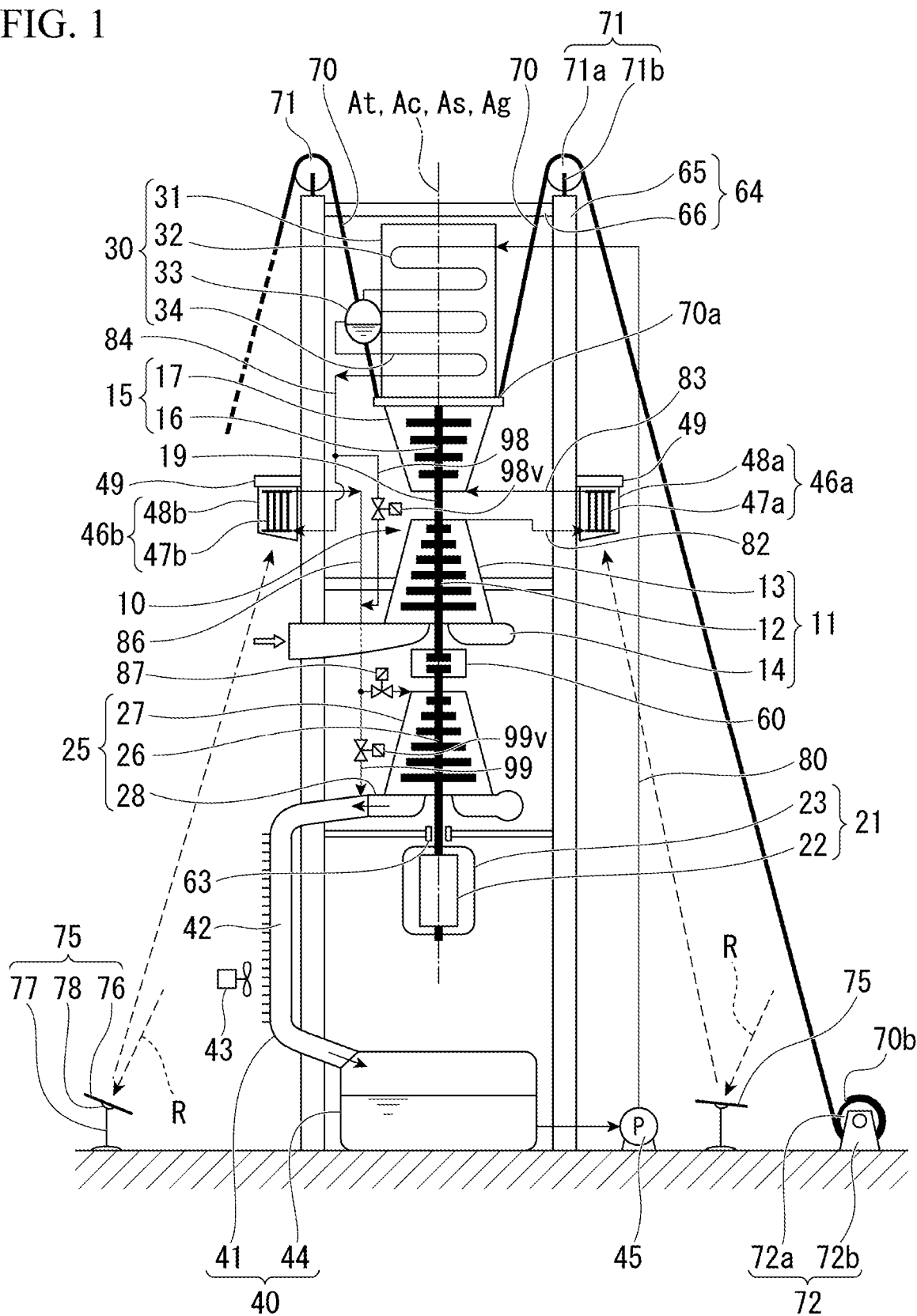
FIG. 1 is an explanatory diagram illustrating a constitution of a solar thermal power generation facility in a first embodiment according to the present invention.

As illustrated in FIG. 1, the solar thermal power generation facility of the present embodiment includes a compressor 11, a medium heating heat receiver 46a, a turbine 15, an exhausted heat recovery boiler 30, a steam superheating heat receiver 46b, a steam turbine 25, a steam condenser 40, a feed pump 45, a power generator 21, a clutch 60, a tower 64, and a plurality of heliostats 75 that reflect sunlight R in target directions.

The compressor 11 compresses air as a working medium to generate compressed air that is a compressed medium. The compressor 11 has a compressor rotor 12 that is rotated about a compressor axis Ac extending in the vertical direction, a compressor casing 13 that covers the compressor rotor 12, and an intake casing 14 that guides outside air into the compressor casing 13.

The medium heating heat receiver 46a receives the sunlight R from the heliostat 75 to heat the compressed air. The medium heating heat receiver 46a has a heat transfer pipe 47a, and a heat receiver casing 48a that covers the heat transfer pipe 47a. A lower side of the heat receiver casing 48a is open. The heat transfer pipe 47a is connected to a discharge port of the compressor 11 by a compressed air line (a compressed medium line) 82.

The turbine 15 is driven by the compressed air heated by the medium heating heat receiver 46a. The turbine 15 has a turbine rotor 16 that is rotated about a turbine axis At extending in the vertical direction, and a turbine casing 17 that covers the turbine rotor 16. A medium inlet of the turbine casing 17 is connected to the heat transfer pipe 47a of the medium heating heat receiver 46a by a heated air line (a heated medium line) 83.

A gas turbine 10 is configured to have the compressor 11, the medium heating heat receiver 46a, and the turbine 15 which are described above. The turbine rotor 16 and the compressor rotor 12 are mechanically and directly coupled to each other and are integrally rotated, and constitute a gas turbine rotor 19. Further, the turbine casing 17 and the compressor casing 13 constitutes a gas turbine casing.

The exhausted heat recovery boiler 30 heats water with the exhausted air (the exhausted medium) that is a high-temperature working medium exhausted from the turbine 15, and converts this water into steam. The exhausted heat recovery boiler 30 has a boiler casing 31 into which the exhausted air from the turbine 15 flows, a economizer 32 and a superheater 34 that are disposed in the boiler casing 31, and an evaporator 33, a part of which is disposed in the boiler casing 31.

The steam superheating heat receiver 46b receives the sunlight R from the heliostat 75, and superheats the steam from the exhausted heat recovery boiler 30. The steam superheating heat receiver 46b has a heat transfer pipe 47b, and a heat receiver casing 48b that covers the heat transfer pipe 47b. A lower side of the heat receiver casing 48b is open. The heat transfer pipe 47b is connected to the superheater 34 of the exhausted heat recovery boiler 30 by a first main steam line 84.

The steam turbine 25 is driven by the steam flowing out of the exhausted heat recovery boiler 30 via the steam superheating heat receiver 46b. The steam turbine 25 has a steam turbine rotor 26 that is rotated about a steam turbine axis As extending in the vertical direction, a steam turbine casing 27 that covers the steam turbine rotor 26, and an exhaust casing 28 that guides steam from the steam turbine casing 27 to the steam condenser 40. The steam turbine rotor 26 is mechanically connected to the gas turbine rotor 19. The heat transfer pipe 47b of the steam superheating heat receiver 46b and the steam turbine casing 27 are connected to each other by a second main steam line 86. The second main steam line 86 is provided with a main steam regulating valve 87 that regulates a flow rate of steam flowing along the second main steam line 86. The first main steam line 84 and the second main steam line 86 are connected to each other by a heat receiver bypass line 98. The heat receiver bypass line 98 is provided with a heat receiver bypass valve 98v.

The steam condenser 40 returns the steam, which is exhausted from the steam turbine 25, to water. The steam condenser 40 is an air-cooled steam condenser. The steam condenser 40 has a heat radiator 41 and a water storage 44. The heat radiator 41 has a finned heat transfer pipe 42 and a fan 43. The finned heat transfer pipe 42 is connected to the exhaust casing 28 of the steam turbine 25. The second main steam line 86 is connected to the exhaust casing 28 of the steam turbine 25 or the finned heat transfer pipe 42 by a steam turbine bypass line 99. The steam turbine bypass line 99 is provided with a steam turbine bypass valve 99v.

The water storage 44 of the steam condenser 40 and the economizer 32 of the exhausted heat recovery boiler 30 are connected to each other by a feed line 80. The feed pump 45 is provided on the feed line 80.

The power generator 21 generates electric power by driving of the turbine 15 and the steam turbine 25. The power generator 21 has a power generator rotor 22 that is rotated about a power generator axis Ag extending in the vertical direction, and a power generator casing 23 that covers the power generator rotor 22. The power generator rotor 22 is directly coupled to the steam turbine rotor 26.

At least one of the plurality of rotors 19, 22 and 26 is supported by a radial bearing 63 that regulates movement thereof in a radial direction while allowing movement thereof in a thrust direction (the vertical direction). The radial bearing 63 is provided in the tower 64.

The clutch 60 is disposed between the gas turbine rotor 19 and the steam turbine rotor 26, and mechanically connects both the rotors 19 and 26 to each other. The clutch 60 switches a connection state between the gas turbine rotor 19 and the steam turbine rotor 26 between a transmission state in which motive power transmission is possible between the gas turbine rotor 19 and the steam turbine rotor 26 and a non-transmission state in which motive power transmission is not performed between the gas turbine rotor 19 and the steam turbine rotor 26.

As described above, the power generator rotor 22 is directly coupled to the steam turbine rotor 26. Accordingly, it can be said that the clutch 60 is a clutch that switches the connection state between the gas turbine rotor 19 and the power generator rotor 22 between the transmission state in which motive power transmission is possible and the non-transmission state in which motive power transmission is not performed between the gas turbine rotor 19 and the power generator rotor 22.

Each of the heliostats 75 has a reflector 76 that reflects the sunlight R, a support leg 77 that supports the reflector 76, and a mirror driving machine 78 that directs the reflector 76 in a target direction. The plurality of heliostats 75 are installed around the tower 64.

The tower 64 supports the compressor 11, the medium heating heat receiver 46a, the turbine 15, the exhausted heat recovery boiler 30, the steam superheating heat receiver 46b, the steam turbine 25, the clutch 60, and the power generator 21. The tower 64 has a plurality of posts 65 that extend in the vertical direction, and a girder 66 that connects the plurality of posts 65 to each other. The posts 65 and the girder 66 are formed of, for instance, steel.

In the present embodiment, the compressor 11, the turbine 15, the exhausted heat recovery boiler 30, the steam turbine 25, the power generator 21, and the water storage 44 of the steam condenser 40 are formed as arranged devices. A plurality of the arranged devices are aligned in the vertical direction. To be specific, in the present embodiment, the exhausted heat recovery boiler 30, the turbine 15, the compressor 11, the steam turbine 25, the power generator 21, and the water storage 44 of the steam condenser 40 are aligned from top to bottom in this order. All the plurality of arranged devices are disposed in a region surrounded by the plurality of posts 65 constituting the tower 64. That is, the arranged devices are devices that are aligned in the tower 64 in the vertical direction. Some of the arranged devices may project from the tower 64.

The solar thermal power generation facility of the present embodiment further includes a plurality of hanging wires 70, a plurality of wire support machines 71, and a plurality of winding machines 72. Each of the hanging wires 70 has a first end 70a and a second end 70b. The first ends 70a of the hanging wires 70 are connected to the turbine casing 17. Each of the wire support machines 71 has a support roller 71a and a roller support machine 71b that rotatably supports the support roller 71a. The roller support machines 71b are provided at the tops of the posts 65. Each of the winding machines 72 has a winding drum 72a and a drum support machine 72b for maintaining rotatability of the winding drum 72a. The second ends 70b of the hanging wires 70 are connected to the winding drums 72a. The support roller 71a is supported between the first end 70a and the second end 70b of the hanging wire 70. The second end 70b side of the hanging wire 70 is wound around the winding drum 72a. A distance from the wire support machine 71 to the first end 70a of the hanging wire 70 can be changed by changing a wound amount of the hanging wire 70 around the winding drum 72a. That is, in the present embodiment, a position of the turbine casing 17 in the vertical direction can be changed by changing the wound amounts of the hanging wires 70.

An exhaust port of the turbine 15 is open upward. The exhausted heat recovery boiler 30 is mechanically connected to the turbine casing 17 of the turbine 15. Further, the compressor rotor 12, the steam turbine rotor 26, and the power generator rotor 22 are mechanically connected to the turbine rotor 16. For this reason, the turbine 15, the exhausted heat recovery boiler 30, the compressor 11, the steam turbine 25, and the power generator 21 are hung from the wire support machines 71 by the hanging wires 70. Accordingly, the turbine 15, the exhausted heat recovery boiler 30, the compressor 11, the steam turbine 25, and the power generator 21 are supported on the tower 64 via the hanging wires 70 and the wire support machines 71. The steam condenser 40 is installed on an installation surface of the tower 64.

The medium heating heat receiver 46a is disposed within a range from a region in which the compressor 11 is disposed in the vertical direction to a region in which the turbine 15 is disposed in the vertical direction. Further, the steam superheating heat receiver 46b is disposed within a range from a region in which the exhausted heat recovery boiler 30 is disposed to a region in which the steam turbine 25 is disposed in the vertical direction. The heat receiver casing 48a of the medium heating heat receiver 46a and the heat receiver casing 48b of the steam superheating heat receiver 46b are hung from brackets 49 fixed to the tower 64.

Next, an operation of the solar thermal power generation facility described above will be described.

The compressor 11 draws in air (a working medium), and compresses the air to generate compressed air (a compressed medium). The compressed air flows into the heat transfer pipe 47a of the medium heating heat receiver 46a. The mirror driving machine 78 of one of the plurality of heliostats 75 adjusts a direction of the reflector 76 such that the sunlight R reflected by the reflector 76 is directed to the medium heating heat receiver 46a. As a result, the sunlight R reflected by the reflector 76 of the heliostat 75 is applied to the heat transfer pipe 47a of the medium heating heat receiver 46a via an opening in the heat receiver casing 48a of the medium heating heat receiver 46a. The compressed air flowing in the heat transfer pipe 47a is heated by heat of the sunlight R which the heat transfer pipe 47a receives.

The compressed air heated by the medium heating heat receiver 46a flows into the turbine casing 17 via the heated air line 83. The turbine rotor 16 is rotated by the compressed air. Since the compressor rotor 12 is directly coupled to the turbine rotor 16, the compressor rotor 12 is rotated integrally with the rotation of the turbine rotor 16.

High-temperature air, which is exhausted from the turbine casing 17, flows into the boiler casing 31 of the exhausted heat recovery boiler 30 as exhausted air (an exhausted medium). Further, water is supplied from the feed line 80 to the economizer 32 of the exhausted heat recovery boiler 30. The exhausted air and the water are subjected to heat exchange in the economizer 32, and the water is heated. The water heated by the economizer 32 flows into the evaporator 33 of the exhausted heat recovery boiler 30. The water from the economizer 32 and the exhausted air are subjected to heat exchange with each other in the evaporator 33, and the water is heated into steam. This steam flows into the superheater 34 of the exhausted heat recovery boiler 30. The steam and the exhausted air are subjected to heat exchange with each other in the superheater 34, and the steam is superheated.

The steam from the exhausted heat recovery boiler 30 flows into the heat transfer pipe 47b of the steam superheating heat receiver 46b via the first main steam line 84. The mirror driving machine 78 of one of the plurality of heliostats 75 adjusts a direction of the reflector 76 such that the sunlight R reflected by the reflector 76 is directed to the steam superheating heat receiver 46b. As a result, the sunlight R reflected by the reflector 76 of the heliostat 75 is applied to the heat transfer pipe 47b of the steam superheating heat receiver 46b via an opening in the heat receiver casing 48b of the steam superheating heat receiver 46b. The steam flowing in the heat transfer pipe 47b is superheated by heat of the sunlight R which the heat transfer pipe 47b receives.

The steam superheated by the steam superheating heat receiver 46b flows into the steam turbine casing 27 via the second main steam line 86. The steam turbine rotor 26 is rotated by this steam.

After the turbine rotor 16 begins to rotate, and the high-temperature exhausted air begins to flow into the boiler casing 31 of the exhausted heat recovery boiler 30, a fixed time is required until steam having a flow rate necessary for driving of the steam turbine 25 is generated. For this reason, when the gas turbine 10 is started, the clutch 60 is brought into a non-transmission state, and motive power transmission is not performed between the gas turbine rotor 19 and the steam turbine rotor 26 and the power generator rotor 22. That is, when the gas turbine 10 is started, only the gas turbine rotor 19 is independently rotated among the gas turbine rotor 19, the steam turbine rotor 26, and the power generator rotor 22. If the steam having a flow rate necessary for driving of the steam turbine 25 begins to be generated in the exhausted heat recovery boiler 30, the main steam regulating valve 87 provided on the second main steam line 86 is opened, and the steam from the exhausted heat recovery boiler 30 flows into the steam turbine casing 27. Furthermore, if the steam having a flow rate necessary for driving of the steam turbine 25 begins to be generated in the exhausted heat recovery boiler 30, the clutch 60 is brought into a transmission state, and motive power transmission is performed between the gas turbine rotor 19 and the steam turbine rotor 26 and the power generator rotor 22. That is, the gas turbine rotor 19, the steam turbine rotor 26, and the power generator rotor 22 are integrally rotated. As a result, electric power generation is initiated in the power generator 21.

As described above, since the solar thermal power generation facility of the present embodiment includes the clutch 60, the gas turbine 10 can be independently operated, for instance, when the gas turbine 10 is started.

The steam exhausted from the steam turbine 25 flows into the finned heat transfer pipe 42 of the steam condenser 40. The fan 43 sends cooling air to the finned heat transfer pipe 42 from the outside of the finned heat transfer pipe 42. The steam from the steam turbine 25 is subjected to heat exchange with the cooling air in the process of flowing in the finned heat transfer pipe 42, and becomes cooled water. This water is collected in the water storage 44. The water collected in the water storage 44 is raised in pressure by the feed pump 45, and is sent to the economizer 32 of the exhausted heat recovery boiler 30 via the feed line 80.

In the present embodiment, the plurality of arranged devices constituting the solar thermal power generation facility are disposed in the region surrounded by the plurality of posts 65 constituting the tower 64 parallel to each other in the vertical direction. For this reason, in the present embodiment, two-dimensional spreading of the tower 64 can be reduced, and an area occupied by the tower 64 can be reduced. Furthermore, in the present embodiment, in comparison with a case where a plurality of devices constituting the solar thermal power generation facility are disposed in a highest stage of the tower 64, the strength required of the structural members constituting the tower 64 can be reduced. In the present embodiment, the water storage 44 of the steam condenser 40 that is a heaviest object during operation among the plurality of devices constituting the solar thermal power generation facility is disposed at a lowest position among positions of the plurality of arranged devices, and the water storage 44 is installed on the installation surface of the tower 64. For this reason, in the present embodiment, the strength required of the structural members constituting the tower 64 can be further reduced. Accordingly, in the present embodiment, the installation costs of the tower 64 can be reduced.

In the present embodiment, the medium heating heat receiver 46a is disposed within the range from the region in which the compressor 11 is disposed to the region in which the turbine 15 is disposed in the vertical direction. For this reason, in the present embodiment, a length of the heated air line 83 that connects the medium heating heat receiver 46a and the turbine 15 to each other can be shortened, and heat dissipation from the heated air line 83 can be curbed. Further, in the present embodiment, the steam superheating heat receiver 46b is disposed within the range from the region in which the exhausted heat recovery boiler 30 is disposed to the region in which the steam turbine 25 is disposed in the vertical direction. For this reason, in the present embodiment, a length of the first main steam line 84 that connects the superheater 34 of the exhausted heat recovery boiler 30 and the steam superheating heat receiver 46b to each other and a length of the second main steam line 86 that connects the steam superheating heat receiver 46b and the steam turbine 25 to each other can be shortened, and heat dissipation from these lines can be curbed.

Further, in the present embodiment, the turbine 15, the exhausted heat recovery boiler 30, the compressor 11, the steam turbine 25, and the power generator 21 are hung from the wire support machines 71 by the hanging wires 70. For this reason, when these devices are inspected or repaired, the wound amounts of the hanging wires 70 wound around the winding drums 72a are gradually reduced, and the devices are lowered downward, and are demounted in turn. Thereby, the devices can be relatively easily inspected or repaired.

Second Embodiment

A second embodiment of the solar thermal power generation facility will be described with reference to FIG. 2.

Figure 2:
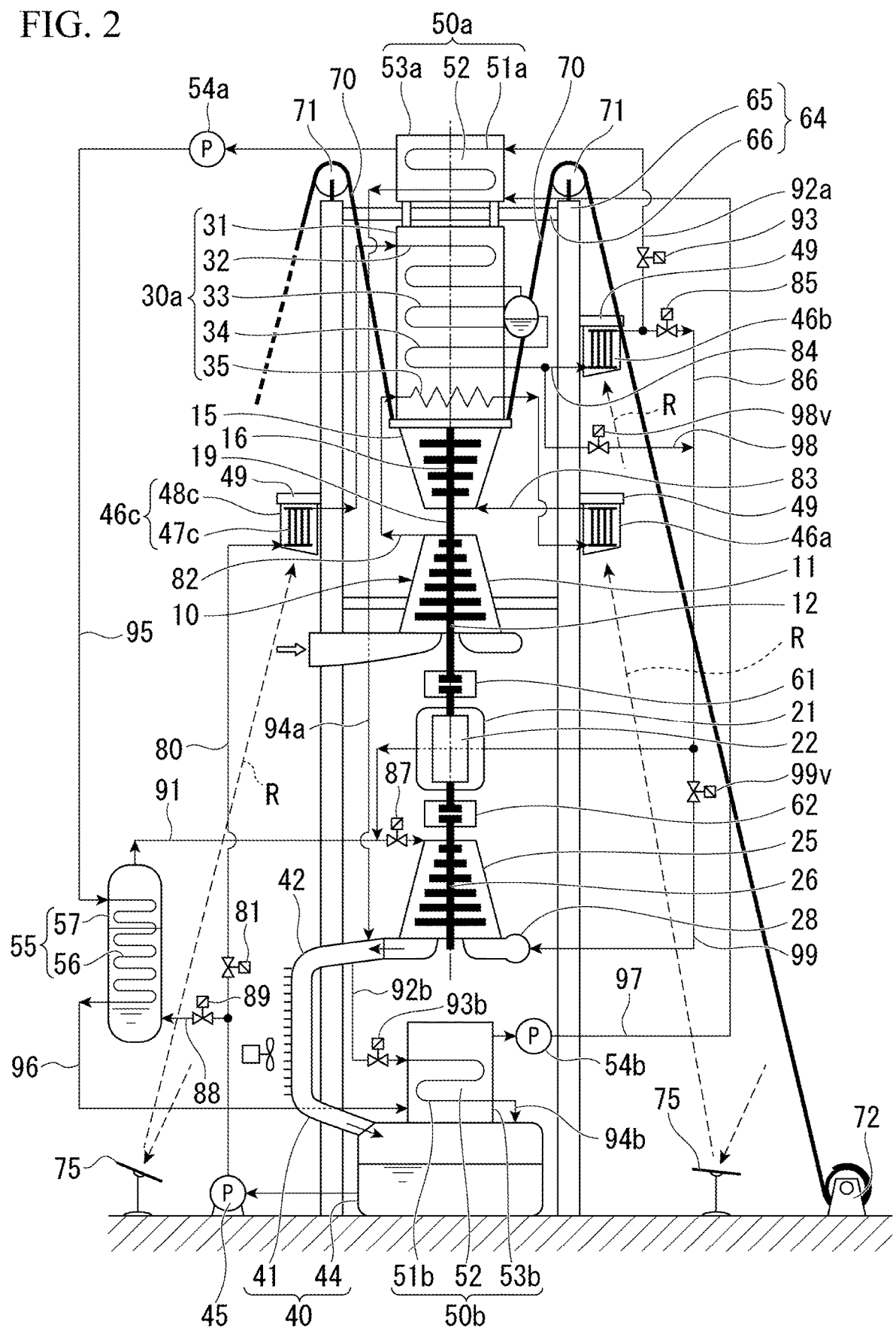
FIG. 2 is an explanatory diagram illustrating a constitution of a solar thermal power generation facility in a second embodiment according to the present invention.

As illustrated in FIG. 2, like the solar thermal power generation facility of the first embodiment, the solar thermal power generation facility of the present embodiment includes a compressor 11, a medium heating heat receiver 46a, a turbine 15, an exhausted heat recovery boiler 30a, a steam superheating heat receiver 46b, a steam turbine 25, a steam condenser 40, a feed pump 45, a power generator 21, a plurality of heliostats 75 that reflect sunlight R in target directions, and a tower 64. The solar thermal power generation facility of the present embodiment further includes a first clutch 61, a second clutch 62, a fed water preheating heat receiver 46c, a high-temperature heat accumulator 50a, and a low-temperature heat accumulator 50b.

The compressor 11, the medium heating heat receiver 46a, the turbine 15, the steam superheating heat receiver 46b, the steam turbine 25, the steam condenser 40, the feed pump 45, the power generator 21, and the heliostats 75 of the present embodiment are the same as the compressor 11, the medium heating heat receiver 46a, the turbine 15, the steam superheating heat receiver 46b, the steam turbine 25, the steam condenser 40, the feed pump 45, the power generator 21, and the heliostats 75 of the first embodiment.

Like the exhausted heat recovery boiler 30 of the first embodiment, the exhausted heat recovery boiler 30a of the present embodiment has a boiler casing 31, an economizer 32, an evaporator 33, and a superheater 34. The exhausted heat recovery boiler 30a of the present embodiment further includes a medium preheater 35. The medium preheater 35 is provided in the course of a compressed air line 82, and is disposed in the boiler casing 31.

The fed water preheating heat receiver 46c receives the sunlight R from the heliostat 75, and heats water flowing along a feed line 80. The fed water preheating heat receiver 46c has a heat transfer pipe 47c and a heat receiver casing 48c that covers the heat transfer pipe 47c. A lower side of the heat receiver casing 48c is open. The heat transfer pipe 47c is provided in the course of the feed line 80.

The high-temperature heat accumulator 50a has a steam heat transfer pipe 51a in which steam flows, and a high-temperature heat accumulation casing 53a that accommodates a heat accumulation material 52 and the steam heat transfer pipe 51a.

The heat accumulation material 52 of the present embodiment is, for instance, a molten salt composed of a mixture of sodium nitrate, sodium nitrite, and potassium nitrate. A melting point of the molten salt ranges from about 130° C. to 170° C. The melting point of the molten salt is a temperature that is lower than a temperature of the steam flowing in the solar thermal power generation facility of the present embodiment. For this reason, if the heat accumulation material 52 of the present embodiment is heated by heat exchange with steam or the like, the heat accumulation material 52 is made to exhibit fluidity. The heat accumulation material 52 is not limited to a molten salt. Any material will do basically as long as the heat accumulation material 52 is, for instance, a material that exhibits fluidity at about 150° C. or higher.

The steam heat transfer pipe 51a of the high-temperature heat accumulator 50a is connected to a high-temperature steam line 92a that branches off from a second main steam line 86. A high-temperature steam regulating valve 93, which regulates a flow rate of steam flowing along the high-temperature steam line 92a, is provided on the high-temperature steam line 92a. Further, a second main steam regulating valve 85, which regulates a flow rate of steam flowing along the second main steam line 86, is provided at a position located on a downstream side of a steam flow relative to a branch position of the high-temperature steam line 92a and on an upstream side of the steam flow relative to a first main steam regulating valve 87 in the course of the second main steam line 86. Further, the steam heat transfer pipe 51a of the high-temperature heat accumulator 50a is also connected to a high-temperature steam exhaust line 94a. The high-temperature steam exhaust line 94a is connected to a finned heat transfer pipe 42 of the steam condenser 40 or an exhaust casing 28 of the steam turbine 25. Further, in the present embodiment, a first main steam line 84 and the second main steam line 86 are connected to a heat receiver bypass line 98. A heat receiver bypass valve 98v is provided on the heat receiver bypass line 98. Here, a first end of the heat receiver bypass line 98 is connected to the first main steam line 84, and a second end of the heat receiver bypass line 98 is connected to the second main steam line 86. However, the first end of the heat receiver bypass line 98 may be connected to the first main steam line 84, and the second end of the heat receiver bypass line 98 may be connected to the high-temperature steam line 92a.

The low-temperature heat accumulator 50b has a steam heat transfer pipe 51b in which steam flows, and a low-temperature heat accumulation casing 53b that covers the heat accumulation material 52 and the steam heat transfer pipe 51b. The steam heat transfer pipe 51b is connected to a low-temperature steam line 92b that branches off from the finned heat transfer pipe 42 of the steam condenser 40 or the exhaust casing 28 of the steam turbine 25. A low-temperature steam regulating valve 93b that regulates a flow rate of steam flowing along the low-temperature steam line 92b is provided on the low-temperature steam line 92b. The steam heat transfer pipe 51b is also connected to a low-temperature steam exhaust line 94b. The low-temperature steam exhaust line 94b is connected to the finned heat transfer pipe 42 or the water storage 44 of the steam condenser 40.

A steam generator 55 has a heat-accumulation-material heat transfer pipe 56 in which the heat accumulation material 52 flows, and a steam generation casing 57 that causes water to stay therein and covers the heat-accumulation-material heat transfer pipe 56. The heat-accumulation-material heat transfer pipe 56 is connected to a high-temperature heat-accumulation-material supply line 95. The high-temperature heat-accumulation-material supply line 95 is connected to the high-temperature heat accumulation casing 53a. A high-temperature heat-accumulation-material pump 54a that raises a pressure of the heat accumulation material 52 from the high-temperature heat accumulation casing 53a is provided on the high-temperature heat-accumulation-material supply line 95. The steam generation casing 57 is connected to an auxiliary feed line 88 that branches off from the feed line 80. An auxiliary fed-water regulating valve 89 that regulates a flow rate of water flowing along the auxiliary feed line 88 is provided on the auxiliary feed line 88.

Further, a fed water regulating valve 81 that regulates the flow rate of the water flowing along the feed line 80 is provided at a position located on a downstream side of a fed water flow relative to a branch position of the auxiliary feed line 88 and on an upstream of the fed water flow relative to the fed water preheating heat receiver 46c in the course of the feed line 80. An auxiliary steam line 91 is connected to the steam generation casing 57. The auxiliary steam line 91 is connected to a position located on a downstream side of a steam flow relative to the second main steam regulating valve 85 and on an upstream side of the steam flow relative to the first main steam regulating valve 87 in the course of the second main steam line 86.

The heat-accumulation-material heat transfer pipe 56 of the steam generator 55 is connected to a high-temperature heat-accumulation-material discharge line 96. The high-temperature heat-accumulation-material discharge line 96 is connected to the low-temperature heat accumulation casing 53b. A low-temperature heat-accumulation-material supply line 97 is connected to the low-temperature heat accumulation casing 53b. The low-temperature heat-accumulation-material supply line 97 is connected to the high-temperature heat accumulation casing 53a. A low-temperature heat-accumulation-material pump 54b that raises a pressure of the heat accumulation material 52 from the low-temperature heat accumulation casing 53b is provided on the low-temperature heat-accumulation-material supply line 97.

Even in the present embodiment, the compressor 11, the turbine 15, the exhausted heat recovery boiler 30a, the steam turbine 25, the power generator 21, the water storage 44 of the steam condenser 40 are also formed as arranged devices. Furthermore, in the present embodiment, the high-temperature heat accumulator 50a and the low-temperature heat accumulator 50b are also formed as arranged devices. The plurality of arranged devices are aligned in the vertical direction. To be specific, in the present embodiment, the high-temperature heat accumulator 50a, the exhausted heat recovery boiler 30a, the turbine 15, the compressor 11, the power generator 21, the steam turbine 25, the low-temperature heat accumulator 50b, and the water storage 44 of the steam condenser 40 are aligned from top to bottom in this order. All the plurality of arranged devices are disposed in a region surrounded by a plurality of posts 65 constituting the tower 64. The arranged devices may be partly projected from this region.

In the present embodiment, the high-temperature heat accumulator 50a, the exhausted heat recovery boiler 30a, the turbine 15, the compressor 11, the power generator 21, and the steam turbine 25 are hung from wire support machines 71 by hanging wires 70. Accordingly, the high-temperature heat accumulator 50a, the exhausted heat recovery boiler 30a, the turbine 15, the compressor 11, the power generator 21, and the steam turbine 25 are supported on the tower 64 via the hanging wires 70 and the wire support machines 71. As in the first embodiment, the steam condenser 40 is installed on an installation surface of the tower 64. Further, the low-temperature heat accumulator 50b is supported on the water storage 44 of the steam condenser 40. Further, in the present embodiment, the steam generator 55 is supported by a stand (not illustrated) disposed outside the tower 64. The steam generator 55 may be supported on the tower 64.

The first clutch 61 is disposed between the gas turbine rotor 19 and the power generator rotor 22, and mechanically connects both the rotors 19 and 22. The first clutch 61 switches a connection state between the gas turbine rotor 19 and the power generator rotor 22 between a transmission state in which motive power transmission is possible and a non-transmission state in which motive power transmission is not performed between the gas turbine rotor 19 and the power generator rotor 22.

The second clutch 62 is disposed between the steam turbine rotor 26 and the power generator rotor 22, and mechanically connects both the rotors 26 and 22 to each other. The second clutch 62 switches a connection state between the steam turbine rotor 26 and the power generator rotor 22 between a transmission state in which motive power transmission is possible and a non-transmission state in which motive power transmission is not performed between the steam turbine rotor 26 and the power generator rotor 22.

In the present embodiment, the medium heating heat receiver 46a is disposed within a range from a region in which the compressor 11 is disposed to a region in which a medium preheater 35 of the exhausted heat recovery boiler 30a is disposed in the vertical direction. The medium heating heat receiver 46a may be disposed within a range from the region in which the compressor 11 is disposed to a region in which the turbine 15 is disposed in the vertical direction. Further, the steam superheating heat receiver 46b is disposed within a range from a region in which the exhausted heat recovery boiler 30a is disposed to a region in which the steam turbine 25 is disposed in the vertical direction. Further, the fed water preheating heat receiver 46c is disposed within a range from a region in which the water storage 44 of the steam condenser 40 is disposed to the region in which the exhausted heat recovery boiler 30a is disposed in the vertical direction. A heat receiver casing 48a of the medium heating heat receiver 46a, a heat receiver casing 48b of the steam superheating heat receiver 46b, and a heat receiver casing 48c of the fed water preheating heat receiver 46c are hung from brackets 49 fixed to the tower 64.

Next, an operation of the solar thermal power generation facility of the present embodiment described above will be described.

Like the compressor 11 of the first embodiment, the compressor 11 of the present embodiment draws in air (a working medium), and compresses the air to generate compressed air (a compressed medium). The compressed air flows into the medium preheater 35 of the exhausted heat recovery boiler 30a via the compressed air line 82. The medium preheater 35 exchanges heat between the exhausted air of the turbine 15 and the compressed air, and heats the compressed air. The compressed air preheated by the medium preheater 35 flows into a heat transfer pipe 47a of the medium heating heat receiver 46a, and is heated by heat of the sunlight R from the heliostat 75.

The compressed air heated by the medium heating heat receiver 46a flows into a turbine casing 17 via a heated air line 83. The turbine rotor 16 is rotated by this compressed air. Since the compressor rotor 12 is directly coupled to the turbine rotor 16, the compressor rotor 12 is rotated integrally with the turbine rotor 16.

High-temperature air, which is exhausted from the turbine casing 17, flows into the boiler casing 31 of the exhausted heat recovery boiler 30a as exhausted air. Further, as in the first embodiment, water supplied from the steam condenser 40 via the feed line 80 is heated into steam at the exhausted heat recovery boiler 30a. In the present embodiment, the water flows into the fed water preheating heat receiver 46c in the process of flowing along the feed line 80, and is heated here. This steam flows into a heat transfer pipe 47b of the steam superheating heat receiver 46b via the first main steam line 84. The steam inside the heat transfer pipe 47b is superheated by the heat of the sunlight R from the heliostat 75.

The steam superheated by the steam superheating heat receiver 46b flows into a steam turbine casing 27 via the second main steam line 86. The steam turbine rotor 26 is rotated by this steam.

In the present embodiment, when the gas turbine 10 is started, the first clutch 61 is in a transmission state, and motive power transmission is performed between the gas turbine rotor 19 and the power generator rotor 22. On the other hand, when the gas turbine 10 is started, the second clutch 62 is in a non-transmission state, and motive power transmission is not performed between the steam turbine rotor 26 and the power generator rotor 22. Accordingly, in the beginning when the gas turbine 10 is started, the power generator 21 generates electric power only by rotation of the gas turbine rotor 19. If steam having a flow rate necessary for driving of the steam turbine 25 begins to be generated at the exhausted heat recovery boiler 30a, the first main steam regulating valve 87 provided on the second main steam line 86 is opened, and the steam from the exhausted heat recovery boiler 30a flows into the steam turbine casing 27. Furthermore, if the steam having a flow rate necessary for driving of the steam turbine 25 begins to be generated at the exhausted heat recovery boiler 30a, the second clutch 62 becomes a transmission state, and motive power transmission is performed between the steam turbine rotor 26 and the power generator rotor 22. That is, the gas turbine rotor 19, the steam turbine rotor 26, and the power generator rotor 22 are integrally rotated. As a result, the power generator 21 generates electric power by rotation of the gas turbine rotor 19 and the steam turbine rotor 26.

As in the first embodiment, some of the steam exhausted from the steam turbine 25 (the exhausted steam) is sent to the steam condenser 40, and is converted into water at the steam condenser 40. Further, the other of the steam exhausted from the steam turbine 25 flows into the steam heat transfer pipe 51b of the low-temperature heat accumulator 50b via the low-temperature steam line 92b.

When the solar thermal power generation facility is in the state described above, the high-temperature steam regulating valve 93 provided on the high-temperature steam line 92a and the auxiliary fed-water regulating valve 89 provided on the auxiliary feed line 88 are in a fully closed state. Further, the second main steam regulating valve 85 provided on the second main steam line 86 is in a fully open state. Furthermore, the fed water regulating valve 81 provided on the feed line 80 is in a fully open state.

In a case where steam is too much even when steam sufficient for driving of the steam turbine 25 is sent from the exhausted heat recovery boiler 30a to the steam turbine 25, the high-temperature steam regulating valve 93 provided on the high-temperature steam line 92a is brought into an open state. As a result, the surplus steam, which excludes the steam sufficient for driving of the steam turbine 25 from the steam from the exhausted heat recovery boiler 30a, flows into the steam heat transfer pipe 51a of the high-temperature heat accumulator 50a via the high-temperature steam line 92a. The steam heat transfer pipe 51a exchanges heat between the steam inside the steam heat transfer pipe 51a and the heat accumulation material 52 outside the steam heat transfer pipe 51a, and heats the heat accumulation material 52 in the high-temperature heat accumulation casing 53a. As a result, heat of the surplus steam is accumulated in the heat accumulation material 52. The surplus steam inside the steam heat transfer pipe 51a flows into the finned heat transfer pipe 42 of the steam condenser 40 or the exhaust casing 28 of the steam turbine 25 via the high-temperature steam exhaust line 94a. The surplus steam flowing into the finned heat transfer pipe 42 or the exhaust casing 28 of the steam turbine 25 is cooled into water in the process of passing the finned heat transfer pipe 42, and then flows into the water storage 44.

If the heat accumulation material 52 inside the high-temperature heat accumulation casing 53*a* begins to be heated, the heat accumulation material 52 is sent into the low-temperature heat accumulation casing 53*b* via the high-temperature heat-accumulation-material supply line 95, the steam generator 55, and the high-temperature heat-accumulation-material discharge line 96 as needed. Further, steam exhausted from the steam turbine 25 flows into the steam heat transfer pipe 51*b* inside the low-temperature heat accumulation casing 53*b*. The steam inside steam heat transfer pipe 51*b* is subjected to heat exchange with the heat accumulation material 52 inside the low-temperature heat accumulation casing 53*b*, and heats the heat accumulation material 52. This steam flows into the water storage 44 of the steam condenser 40 via the low-temperature steam exhaust line 94*b*. The heat accumulation material 52 inside the low-temperature heat accumulation casing 53*b* is sent into the high-temperature heat accumulation casing 53*a* via the low-temperature heat-accumulation-material supply line 97 by the low-temperature heat-accumulation-material pump 54*b*. That is, the heat accumulation material 52 circulates between the inside of the high-temperature heat accumulation casing 53*a* and the inside of the low-temperature heat accumulation casing 53*b*.

A period for which the electric power generation is performed by driving of the gas turbine 10 is only a period for which the sun shines. In other words, the electric power generation cannot be performed by driving of the gas turbine 10 for a period for which the sun does not shine.

In the present embodiment, the heat accumulation material 52 is provided to conduct the electric power generation even for the period for which the sun does not shine.

If the sun does not shine, the fed water regulating valve 81 provided on the feed line 80 is brought into a fully closed state, and the auxiliary fed-water regulating valve 89 provided on the auxiliary feed line 88 is brought into a fully open state. Furthermore, the second main steam regulating valve 85 provided on the second main steam line 86 is brought into a fully closed state. Moreover, the high-temperature heat-accumulation-material pump 54*a* and the low-temperature heat-accumulation-material pump 54*b* are driven to cause the heat accumulation material 52 heated by steam to circulate between the inside of the high-temperature heat accumulation casing 53*a* and the inside of the low-temperature heat accumulation casing 53*b*. As a result, the heat accumulation material 52 heated in the high-temperature heat accumulation casing 53*a* flows into the heat-accumulation-material heat transfer pipe 56 of the steam generator 55 via the high-temperature heat-accumulation-material supply line 95. Further, the water stored in the water storage 44 of the steam condenser 40 flows into the steam generation casing 57 via the feed line 80 and the auxiliary feed line 88. The heat-accumulation-material heat transfer pipe 56 exchanges heat between the heat accumulation material 52 inside the heat-accumulation-material heat transfer pipe 56 and the water outside the heat-accumulation-material heat transfer pipe 56, heats the water, and converts the water into steam. This steam is supplied into the steam turbine casing 27 via the auxiliary steam line 91. The steam turbine rotor 26 is rotated by this steam. As a result, the power generator 21 generates electric power only by driving of the steam turbine 25. When the electric power is generated only by the steam turbine 25, the first clutch 61 is in a non-transmission state, and motive power transmission is not performed between the gas turbine rotor 19 and the power generator rotor 22. On the other hand, the second clutch 62 is in a transmission state, and motive power transmission is performed between the steam turbine rotor 26 and the power generator rotor 22. Accordingly, when the electric power is generated by driving of only the steam turbine 25, there is no need to rotate the gas turbine rotor 19, and efficiency of the electric power generation caused by the steam turbine 25 can be enhanced.

A quantity of heat accumulated in the heat accumulation material 52 is gradually reduced by heat exchange between the heat accumulation material 52 and the water in the steam generator 55. For this reason, if a prescribed time has elapsed after steam begins to be supplied from the steam generator 55 to the steam turbine 25, steam sufficient for driving of the steam turbine 25 cannot be sent from the steam generator 55 to the steam turbine 25. Accordingly, if the steam sufficient for driving of the steam turbine 25 cannot be sent from the exhausted heat recovery boiler 30*a* or the steam generator 55 to the steam turbine 25, the first main steam regulating valve 87 is closed, and driving of the steam turbine 25 is stopped.

The gas turbine 10 and the steam turbine 25 are driven for the period for which the sun shines. However, a small amount of electric power generation may be requested of the power generator 21 from the outside for the period for which the sun shines. In this case, in the present embodiment, only the gas turbine 10 is driven without driving the steam turbine 25, and the electric power is generated by driving of only the gas turbine 10.

In this case, the fed water regulating valve 81 and the auxiliary fed-water regulating valve 89 are brought into a fully closed state, and water is made not to be supplied to the exhausted heat recovery boiler 30*a* or the steam generator 55. Furthermore, the first clutch 61 is brought into a transmission state, and motive power transmission is made to be performed between the gas turbine rotor 19 and the power generator rotor 22. On the other hand, the second clutch 62 is brought into a non-transmission state, and motive power transmission is made not to be performed between the steam turbine rotor 26 and the power generator rotor 22. Accordingly, when the electric power is generated by driving of only the gas turbine 10, there is no need to rotate the steam turbine rotor 26, and efficiency of the electric power generation caused by the gas turbine 10 can be enhanced.

In the case where the electric power is generated only by driving of the gas turbine 10, water may be made to be supplied to the exhausted heat recovery boiler 30*a* by opening the fed water regulating valve 81. In this case, the second main steam regulating valve 85 is brought into a fully closed state, and the high-temperature steam regulating valve 93 is brought into a fully open state. The water supplied to the exhausted heat recovery boiler 30*a* is heated by the exhausted air, which is exhausted from the turbine 15, in the exhausted heat recovery boiler 30*a*, and becomes steam. This steam flows into the steam heat transfer pipe 51*a* of the high-temperature heat accumulator 50*a* via the high-temperature steam line 92*a*. The steam heat transfer pipe 51*a* exchanges heat between the steam inside the steam heat transfer pipe 51*a* and the heat accumulation material 52 outside the steam heat transfer pipe 51*a*, and heats the heat accumulation material 52 inside the high-temperature heat accumulation casing 53*a*. As a result, heat of the steam is accumulated in the heat accumulation material 52. Further, the steam inside the steam heat transfer pipe 51*a* of the high-temperature heat accumulator 50*a* flows into the steam heat transfer pipe 51b of the low-temperature heat accumulator 50b via the high-temperature steam exhaust line 94a, the finned heat transfer pipe 42 or the exhaust casing 28, and the low-temperature steam line 92b. The steam heat transfer pipe 51b exchanges heat between the steam inside the steam heat transfer pipe 51b and the heat accumulation material 52 outside the steam heat transfer pipe 51b, and heats the heat accumulation material 52 inside the low-temperature heat accumulation casing 53b. As a result, heat of the steam is also accumulated in the heat accumulation material 52. That is, even in the case where the electric power is generated only by driving of the gas turbine 10, a heat accumulating operation for the heat accumulation material 52 may be performed.

As described above, in the present embodiment, the electric power generation is performed even for the period for which the sun does not shine. Furthermore, in the present embodiment, the electric power can be generated only by driving of the gas turbine 10, only by driving of the steam turbine 25, or by driving of both the gas turbine 10 and the steam turbine 25. Accordingly, in the present embodiment, even in a case where a request of the amount of the electric power generation from the outside is greatly changed, the present invention can cope with the request of the amount of the electric power generation.

Further, even in the present embodiment, as in the first embodiment, the plurality of arranged devices constituting the solar thermal power generation facility are disposed within the region surrounded by the plurality of posts 65 constituting the tower 64 side by side in the vertical direction. For this reason, even in the present embodiment, an area occupied by the tower 64 can be reduced, the strength required of the structural members constituting the tower 64 can be lowered, and the installation costs of the tower 64 can be reduced.

In the present embodiment, a part of the feed line 80 may pass through at least one of the low-temperature heat accumulation casing 53b and the high-temperature heat accumulation casing 53a. In this case, a part of the feed line 80 is brought into contact with the heat accumulation material 52 inside the heat accumulation casing passing through this heat accumulation casing, and thereby the water passing the feed line 80 can be preheated by heat of the heat accumulation material 52.

Further, in the present embodiment, the plurality of arranged devices are aligned in the order of the high-temperature heat accumulator 50a, the exhausted heat recovery boiler 30a, the turbine 15, the compressor 11, the power generator 21, the steam turbine 25, the low-temperature heat accumulator 50b, and the water storage 44 of the steam condenser 40 from top to bottom. However, the order in which the plurality of arranged devices are arranged may not be as above.

To be specific, the plurality of arranged devices may be aligned, for example, in the order of any of (1) to (7) below from top to bottom.

(1) The order of the high-temperature heat accumulator 50a, the steam turbine 25, the power generator 21, the exhausted heat recovery boiler 30a, the turbine 15, the compressor 11, the low-temperature heat accumulator 50b, and the water storage 44

(2) The order of the exhausted heat recovery boiler 30a, the turbine 15, the compressor 11, the steam turbine 25, the power generator 21, the high-temperature heat accumulator 50a, the low-temperature heat accumulator 50b, and the water storage 44

(3) The order of the exhausted heat recovery boiler 30a, the turbine 15, the compressor 11, the high-temperature heat accumulator 50a, the low-temperature heat accumulator 50b, the power generator 21, the steam turbine 25, the water storage 44

(4) The order of the compressor 11, the turbine 15, the exhausted heat recovery boiler 30a, the power generator 21, the high-temperature heat accumulator 50a, the low-temperature heat accumulator 50b, the steam turbine 25, the water storage 44

(5) The order of the high-temperature heat accumulator 50a, the low-temperature heat accumulator 50b, the power generator 21, the exhausted heat recovery boiler 30a, the turbine 15, the compressor 11, the steam turbine 25, the water storage 44

(6) The order of the exhausted heat recovery boiler 30a, the turbine 15, the compressor 11, the power generator 21, the steam turbine 25, the high-temperature heat accumulator 50a, the low-temperature heat accumulator 50b, the water storage 44

(7) The order of the high-temperature heat accumulator 50a, the low-temperature heat accumulator 50b, the exhausted heat recovery boiler 30a, the turbine 15, the compressor 11, the power generator 21, the steam turbine 25, the water storage 44

The arrangement order of the plurality of arranged devices in the present embodiment is common to that of the plurality of arranged devices exemplified above in that the water storage 44 is disposed at the lowest position among the plurality of arranged devices. This is because the water storage 44 of the steam condenser 40 among the plurality of devices constituting the solar thermal power generation facility is the heaviest object during operation as described in the first embodiment.

As described above, because the water storage 44 of the steam condenser 40 is preferably disposed at the lowest position, it is preferred that the steam turbine 25 that discharges steam to the steam condenser 40 is basically disposed on a side closer to the steam condenser 40 than the gas turbine 10, namely below the gas turbine 10.

The exhausted heat recovery boiler 30a, which generates steam using the exhausted air from the gas turbine 10, is lighter than the compressor 11 or the turbine 15 constituting the gas turbine 10. For this reason, the exhausted heat recovery boiler 30a is preferably disposed above the compressor 11 or the turbine 15 constituting the gas turbine 10. Furthermore, it is the turbine 15 of the gas turbine 10 that sends the exhausted air to the exhausted heat recovery boiler 30a. The exhausted air (the exhausted medium) exhausted from the turbine 15 is a high temperature, and thus rises due to natural convection. Accordingly, the turbine 15 is preferably disposed above the compressor 11, and the exhausted heat recovery boiler 30a is preferably disposed on the turbine 15.

Further, in a case where the first clutch 61 and the second clutch 62 are provided to diversify a form of the electric power generation, the compressor 11 and the turbine 15 are preferably disposed on one of an upper side in the vertical direction and a lower side in the vertical direction with respect to the power generator 21 like the arrangement order of the present embodiment or the exemplified arrangement order of (1), (3), (4), (6), and (7) described above, and the steam turbine 25 is preferably disposed on the other of the upper side in the vertical direction and the lower side in the vertical direction.

Further, the arrangement order of the plurality of arranged devices in the solar thermal power generation facilities of the first embodiment described previously and third and fourth embodiments to be described below may be set to any of the arrangement order of the plurality of arranged devices in the present embodiment and the arrangement order of the plurality of arranged devices exemplified above. However, the solar thermal power generation facilities of the first embodiment and the third and fourth embodiments to be described below do not include the high-temperature heat accumulator 50a and the low-temperature heat accumulator 50b. For this reason, in a case where any of the arrangement order of the plurality of arranged devices in the present embodiment and the arrangement order of the plurality of arranged devices exemplified above is adopted as the arrangement order of the plurality of arranged devices in the solar thermal power generation facilities of the first embodiment and the third and fourth embodiments to be described below, it becomes the arrangement order in which the high-temperature heat accumulator 50a and the low-temperature heat accumulator 50b are omitted.

Third Embodiment

Figure 3:
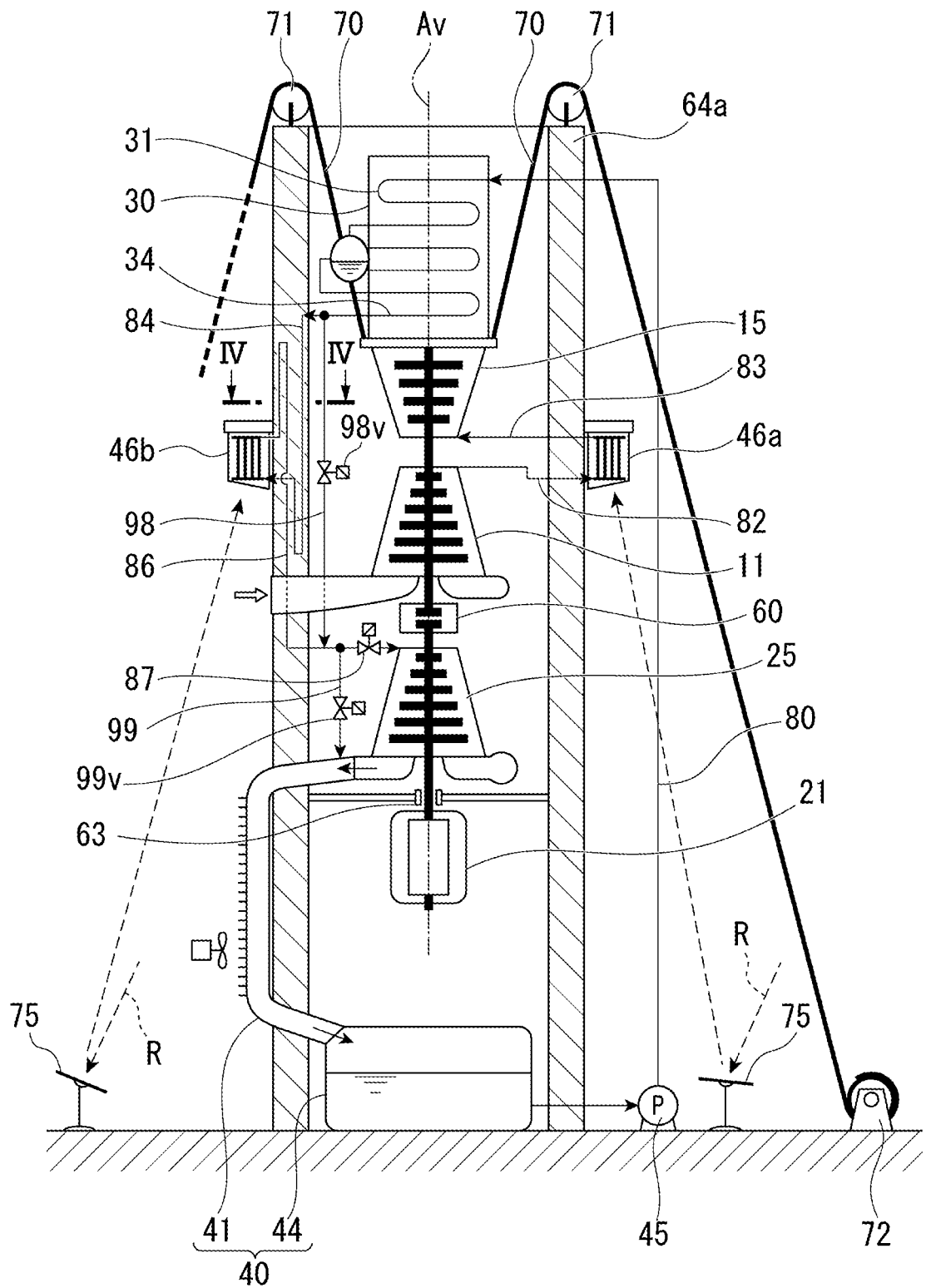
FIG. 3 is an explanatory diagram illustrating a constitution of a solar thermal power generation facility in a third embodiment according to the present invention
Figure 4:
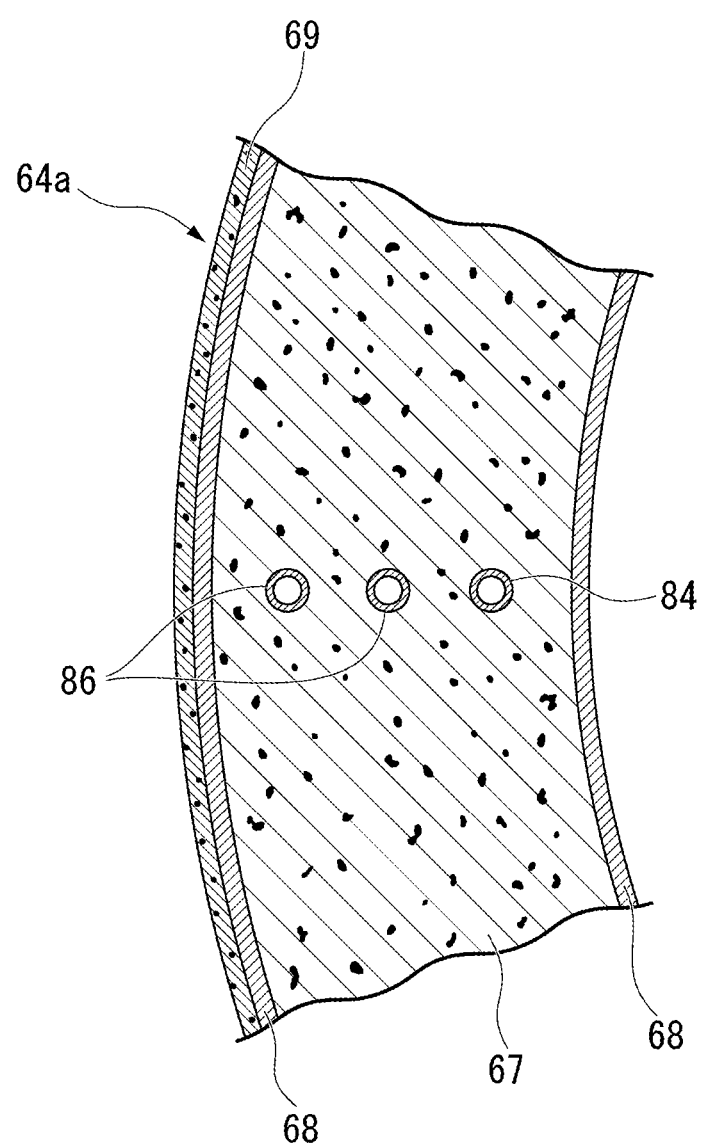
FIG. 4 is a sectional diagram taken along line IV-IV in FIG. 3.

A third embodiment of the solar thermal power generation facility will be described with reference to FIGS. 3 and 4.

The solar thermal power generation facility of the present embodiment is a modification of the solar thermal power generation facility of the first embodiment. As illustrated in FIG. 3, like the solar thermal power generation facility of the first embodiment, the solar thermal power generation facility of the present embodiment includes an exhausted heat recovery boiler 30, a turbine 15, a compressor 11, a clutch 60, a steam turbine 25, a power generator 21, a steam condenser 40, a medium heating heat receiver 46a, a steam superheating heat receiver 46b, a feed pump 45, a plurality of heliostats 75, and a tower 64a. However, the tower 64a of the present embodiment is different from the tower 64 of the first embodiment.

The tower 64a of the present embodiment has a cylindrical shape whose center is a virtual axis Av extending in the vertical direction. As illustrated in FIG. 4, the tower 64a includes a first structure 67 that is formed of, for instance, concrete, second structures 68 that surround an outer circumference of the first structure 67 and are formed of, for instance, a steel plate, and a heat insulator 69 that covers a part of an outer circumference of the second structure 68. Like the shape of the tower 64a, the first structure 67 has a cylindrical shape whose center is the aforementioned virtual axis Av. The second structures 68 are disposed to be in contact with inner and outer circumferential surfaces of the cylindrical first structure 67. That is, the second structures 68 formed of, for instance, a steel plate, function as frames of the concrete of which the first structure 67 is formed. The heat insulator 69 is at least disposed to be in contact with an outer circumferential surfaces of the second structure 68 located on the outer circumferential side. Furthermore, the heat insulator 69 may be disposed to be in contact with an inner circumferential surfaces of the second structure 68 located on the inner circumferential side.

The concrete has a high heat accumulation characteristic. For this reason, the concrete is used as a heat accumulation material. Accordingly, the first structure 67 of the tower 64a of the present embodiment is formed of a heat accumulation material.

Even in the present embodiment, as in the first embodiment, the exhausted heat recovery boiler 30, the turbine 15, the compressor 11, the steam turbine 25, the power generator 21, and the water storage 44 of the steam condenser 40 are formed as arranged devices. These arranged devices are disposed in the cylindrical tower 64a in parallel in the vertical direction.

All of a part of a first main steam line 84 that connects a superheater 34 of the exhausted heat recovery boiler 30 and the steam superheating heat receiver 46b to each other, a part of a second main steam line 86 that connects the steam superheating heat receiver 46b and the steam turbine 25 to each other, a part of a compressed air line 82 that connects the compressor 11 and the medium heating heat receiver 46a to each other, a part of a heated air line 83 that connects the medium heating heat receiver 46a and the turbine 15 to each other, and a part of a feed line 80 pass through the inside of the first structure 67 of the tower 64a, and are in contact with the first structure 67.

In the present embodiment, in a case where a temperature of steam flowing along the first main steam line 84 is higher than that of the first structure 67 that is the heat accumulation material, heat of the steam is accumulated in the first structure 67. Conversely, in a case where the temperature of the steam flowing along the first main steam line 84 is lower than that of the first structure 67, the steam is superheated by the heat accumulated in the first structure 67. Likewise, in a case where a temperature of steam flowing along the second main steam line 86 is higher than that of the first structure 67, heat of the steam is accumulated in the first structure 67. Conversely, in a case where the temperature of the steam flowing along the second main steam line 86 is lower than that of the first structure 67, the steam is superheated by the heat accumulated in the first structure 67. For this reason, even if a temperature of steam from the exhausted heat recovery boiler 30 varies due to, for instance, a change in weather, and furthermore even if a temperature of steam from the steam superheating heat receiver 46b varies, a sudden change in a temperature of steam supplied to the steam turbine 25 can be curbed by a flow of heat between the steam and the first structure 67 that is the heat accumulation material, and predetermined steam conditions can be held. For this reason, in the present embodiment, in spite of, for instance, the change in weather, output of the steam turbine 25 can be stabilized.

In the present embodiment, in a case where a temperature of air flowing along a compressed air line 82 is higher than that of the first structure 67 that is the heat accumulation material, heat of the air is accumulated in the first structure 67. Conversely, in a case where the temperature of the air flowing along the compressed air line 82 is lower than that of the first structure 67, the air is heated by the heat accumulated in the first structure 67. Further, a temperature of air flowing along a heated air line 83 is basically higher than that of the first structure 67. For this reason, some of the air flowing along the heated air line 83 is accumulated in the first structure 67. As described above, the heat accumulated in the first structure 67 is chiefly used to superheat the steam flowing along the first main steam line 84 and the second main steam line 86. In the present embodiment, even if a temperature of air from the medium heating heat receiver 46a varies due to, for instance, a change in weather, a sudden change in the air flowing into the turbine 15 can be curbed by a flow of heat between the air and the first structure 67. As a result, in the present embodiment, output of the gas turbine 10 can be stabilized.

A temperature of water flowing along the feed line 80 is lower than that of the first structure 67 that is the heat accumulation material. For this reason, the temperature of the water flowing along the feed line 80 is preheated by the heat accumulated in the first structure 67, and then flows into the exhausted heat recovery boiler 30. Thus, in the present embodiment, the steam can be efficiently generated by the exhausted heat recovery boiler 30.

As described above, in the present embodiment, in spite of, for instance, the change in weather, the gas turbine 10 or the steam turbine 25 can be stably operated. Further, in the present embodiment, the steam can be efficiently generated by the exhausted heat recovery boiler 30.

Furthermore, even in the present embodiment, as in the first embodiment, the plurality of arranged devices constituting the solar thermal power generation facility are disposed in the tower 64a in parallel in the vertical direction. For this reason, even in the present embodiment, an area occupied by the tower 64a can be reduced, strength required of structural members constituting the tower 64a can be reduced, and installation costs of the tower 64a can be reduced.

Fourth Embodiment

Figure 5:
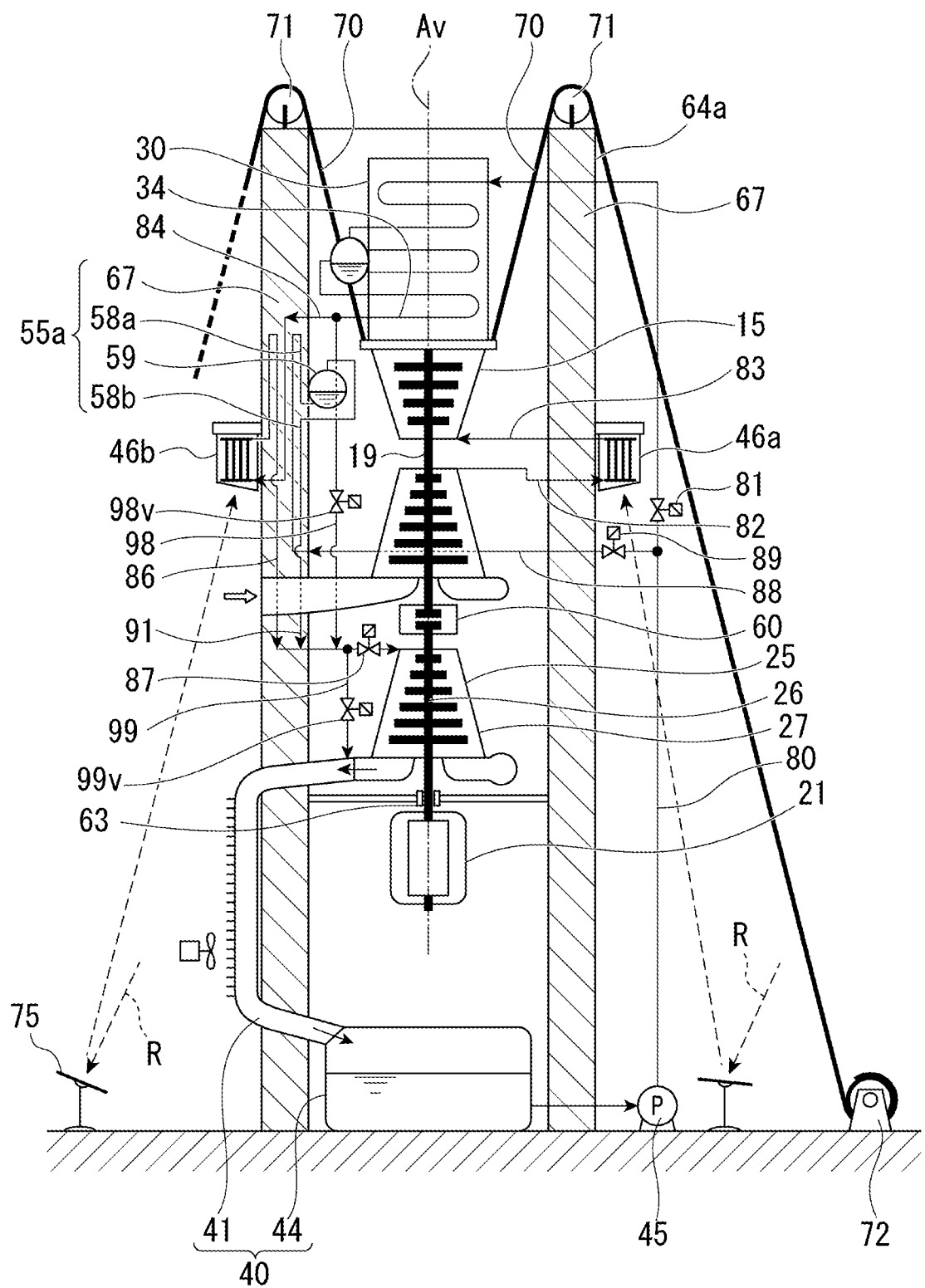
FIG. 5 is an explanatory diagram illustrating a constitution of a solar thermal power generation facility in a fourth embodiment according to the present invention.

A fourth embodiment of the solar thermal power generation facility will be described with reference to FIG. 5.

The solar thermal power generation facility of the present embodiment is a modification of the solar thermal power generation facility of the third embodiment. As illustrated in FIG. 5, in the solar thermal power generation facility of the present embodiment, a steam generator 55a is added to the solar thermal power generation facility of the third embodiment.

A steam generator 55a of the present embodiment has a first heat transfer pipe 58a along which water flows, a steam drum 59 into which water from the first heat transfer pipe 58a flows, a second heat transfer pipe 58b along which steam generated in the steam drum 59 flows, and a part of a first structure 67 that is a heat accumulation material. All of the first heat transfer pipe 58a and the second heat transfer pipe 58b passes through the first structure 67, and are in contact with the first structure 67.

The first heat transfer pipe 58a is connected to an auxiliary feed line 88 that branches off from a feed line 80. For this reason, water stored in a water storage 44 of a steam condenser 40 flows into the first heat transfer pipe 58a via the feed line 80 and the auxiliary feed line 88. An auxiliary fed-water regulating valve 89 that regulates a flow rate of the water flowing along the auxiliary feed line 88 is provided on the auxiliary feed line 88. Further, a fed water regulating valve 81 that regulates a flow rate of the water flowing along the feed line 80 is provided at a position located on a downstream side of a fed water flow relative to a branch position of the auxiliary feed line 88 and on a downstream side of a fed water flow relative to an exhausted heat recovery boiler 30 in the course of the feed line 80. An auxiliary steam line 91 is connected to the second heat transfer pipe 58b. The auxiliary steam line 91 is connected to a position located on an upstream side of a steam flow relative to a main steam regulating valve 87 in the course of a second main steam line 86.

Even in the present embodiment, as in the third embodiment, all of a part of a first main steam line 84 that connects a superheater 34 of the exhausted heat recovery boiler 30 and a steam superheating heat receiver 46b to each other, a part of the second main steam line 86 that connects the steam superheating heat receiver 46b and a steam turbine 25 to each other, a part of a compressed air line 82 that connects a compressor 11 and a medium heating heat receiver 46a to each other, a part of a heated air line 83 that connects a medium heating heat receiver 46a and a turbine 15 to each other, and a part of the feed line 80 pass through the first structure 67 of the tower 64a, and are in contact with the first structure 67. For this reason, the first structure 67 that is a heat accumulation material may be subjected to heat accumulation by steam flowing along a first main steam line 84 and the second main steam line 86. Further, the first structure 67 may also be subjected to heat accumulation by air flowing along the compressed air line 82 and the heated air line 83.

Even in the present embodiment, electric power generation can be performed by driving of only the steam turbine 25. In the case where the electric power generation can be performed by driving of only the steam turbine 25, a clutch 60 is brought into a non-transmission state, and motive power transmission is made not to be performed between a gas turbine rotor 19 and a steam turbine rotor 26 and a power generator rotor 22. Even if the clutch 60 is in a disconnection state, the steam turbine rotor 26 and the power generator rotor 22 are directly coupled in a mechanical way, and the power generator rotor 22 is rotated by rotation of the steam turbine rotor 26. In the case where the electric power generation can be performed by driving of only the steam turbine 25, the fed water regulating valve 81 is brought into a fully closed state, whereas the auxiliary fed-water regulating valve 89 is brought into a fully open state.

The water from the water storage 44 of the steam condenser 40 flows into the first heat transfer pipe 58a, which constitutes a part of a steam generator 55a, via the feed line 80 and the auxiliary feed line 88. The first heat transfer pipe 58a exchanges heat between water flowing in the first heat transfer pipe 58a and the first structure 67 that is a heat accumulation material outside the first heat transfer pipe 58a, heats the water, and converts the water into steam. This steam flows into the second heat transfer pipe 58b constituting a part of the steam generator 55a. The second heat transfer pipe 58b exchanges heat between steam flowing in the second heat transfer pipe 58b and the first structure 67 that is a heat accumulation material outside the second heat transfer pipe 58b, and superheats the steam. The steam superheated on the second heat transfer pipe 58b flows into a steam turbine casing 27 via the auxiliary steam line 91 and the second main steam line 86. The steam turbine rotor 26 is rotated by this steam. As a result, the power generator 21 generates electric power by rotation of the power generator rotor 22 accompanied with rotation of the steam turbine rotor 26.

As described above, even if the first structure 67 that is the heat accumulation material serves as a component of the steam generator 55a, steam is generated by heat accumulated in the first structure 67, and the steam turbine 25 can be driven by this steam.

Even in the present embodiment, as in the second embodiment, heat of the steam exhausted from the steam turbine 25 may also be accumulated in the first structure 67 that is the heat accumulation material.

Further, a tower 64a of the present embodiment and the tower 64a of the third embodiment are formed in a cylindrical shape whose center is a virtual axis Av extending in the vertical direction. However, even if the tower is made up of a plurality of posts, the tower may be made up of a plurality of walls. In the case where the tower is made up of the plurality of posts, each of the posts is formed of the first structure 67, a second structure 68, and a heat insulator 69. Further, in the case where the tower is made up of the plurality of walls, each of the walls is formed of the first structure 67, the second structure 68, and the heat insulator 69.

Further, even in the present embodiment, as described in the second embodiment, a compressor 11 and a turbine 15 may be disposed on one of an upper side in the vertical direction and a lower side in the vertical direction with respect to the power generator 21, and the steam turbine 25 may be disposed on the other of the upper side in the vertical direction and the lower side in the vertical direction. In this case, the first clutch 61 described in the second embodiment is disposed between the gas turbine rotor 19 and the power generator rotor 22, and the second clutch 62 described in the second embodiment is disposed between the power generator rotor 22 and the steam turbine rotor 26. In this way, the first clutch 61 and the second clutch 62 are disposed and thereby, even in the present embodiment, as in the second embodiment, electric power can be generated at the power generator 21 by driving of only a gas turbine 10, by driving of only the steam turbine 25, or by driving of both the gas turbine 10 and the steam turbine 25.

Fifth Embodiment

Figure 6:
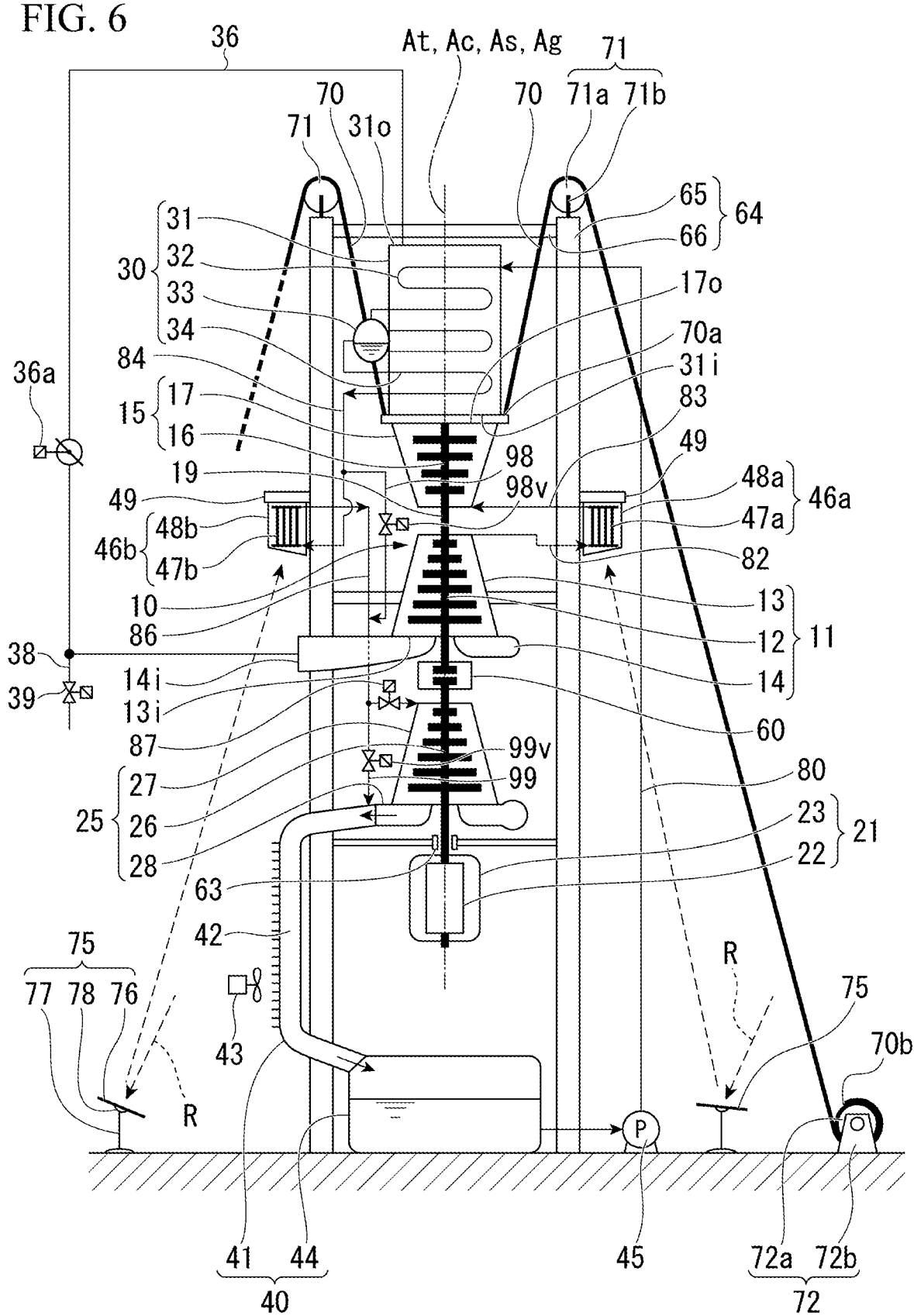
FIG. 6 is an explanatory diagram illustrating a constitution of a solar thermal power generation facility in a fifth embodiment according to the present invention.

A fifth embodiment of the solar thermal power generation facility will be described with reference to FIG. 6.

The solar thermal power generation facility of the present embodiment is a modification of the solar thermal power generation facility of the first embodiment. As illustrated in FIG. 6, like the solar thermal power generation facility of the first embodiment, the solar thermal power generation facility of the present embodiment includes an exhausted heat recovery boiler 30, a turbine 15, a compressor 11, a clutch 60, a steam turbine 25, a power generator 21, a steam condenser 40, a medium heating heat receiver 46a, a steam superheating heat receiver 46b, a feed pump 45, a plurality of heliostats 75, and a tower 64. The solar thermal power generation facility of the present embodiment further includes a circulatory line 36, a pressure regulating mechanism 36a, a medium replenishment line 38, and a medium replenishing valve 39.

A compressor casing 13 has a main body inlet 13i into which a working medium flows. An intake casing 14 of the compressor 11 is connected to the main body inlet 13i. The intake casing 14 has an intake inlet 14i into which the working medium flows. A turbine casing 17 has a turbine outlet 17o that exhausts the working medium. A boiler casing 31 has a boiler inlet 31i into which the working medium from the turbine 15 flows, a boiler outlet 31o that exhausts the working medium. The turbine outlet 17o and the boiler inlet 31i are connected to each other.

The circulatory line 36 connects the boiler outlet 31o of the exhausted heat recovery boiler 30 and the intake inlet 14i of the compressor 11 to each other. The circulatory line 36 guides the working medium exhausted from the boiler outlet 31o of the exhausted heat recovery boiler 30 into the compressor casing 13 via the intake casing 14. Accordingly, a circulatory system of the working medium which has a gas turbine casing, the boiler casing 31, and the circulatory line 36 is formed.

The pressure regulating mechanism 36a is provided on the circulatory line 36. The pressure regulating mechanism 36a regulates a pressure inside the circulatory line 36. The pressure regulating mechanism 36a is, for instance, a damper.

The medium replenishment line 38 is connected to the circulatory line 36. The medium replenishing valve 39 is provided on the medium replenishment line 38. If an amount of the working medium in the aforementioned circulatory system is reduced, the working medium is replenished from the medium replenishment line 38 into the circulatory system by opening the medium replenishing valve 39.

The working medium in the first to fourth embodiments is air. The working medium of the present embodiment is a low boiling point medium having a lower evaporating temperature than air. The low boiling point medium includes, for instance, $CO_2$ or a medium used in an organic Rankine cycle. The medium used in the organic Rankine cycle includes, for instance, the following materials.

Organic halogen compounds such as trichloroethylene, tetrachloroethylene, monochlorobenzene, dichlorobenzene, perfluorodecaline, and so on, Alkanes such as butane, propane, pentane, hexane, heptane, octane, decane, and so on, Cyclic alkanes such as cyclopentane, cyclohexane, and so on, Thiophenes, ketones, and aromatic compounds, Refrigerants such as R134a, R245fa, and so on, and Combinations of the foregoing.

In the present embodiment, since the compressor 11 draws in the working medium exhausted from the exhausted heat recovery boiler 30, a temperature of the working medium which the compressor 11 draws in becomes higher, compared to a case where, as in the above embodiments, the compressor 11 draws in the outside air acting as the working medium. Furthermore, in the present embodiment, since the compressor 11 draws in the working medium exhausted from the exhausted heat recovery boiler 30, a pressure of the working medium which the compressor 11 draws in can become higher, compared to a case where, as in the above embodiments, the compressor 11 draws in the outside air acting as the working medium.

Accordingly, in the present embodiment, the working medium having higher temperature and pressure than those of the above embodiments can be supplied to the turbine 15. For this reason, in the present embodiment, output of the gas turbine can be enhanced, compared to the above embodiments.

Further, in the present embodiment, the low boiling point medium having a lower evaporating temperature than air is used as the working medium. For this reason, even in a case where a turbine outlet temperature of the working medium is the same as a case where air is used as the working medium, a pressure in the circulatory line 36 is regulated by the pressure regulating mechanism 36a, and thereby a temperature range in which a phase of the working medium becomes a gas phase can be widened. Accordingly, when energy is obtained from the working medium of the gas phase, an energy difference can be increased in the present embodiment, compared to the case where the air is used as the working medium. For this reason, in the present embodiment, from this viewpoint, the output of the gas turbine can be enhanced, compared to the above embodiments.

In the present embodiment, if the intake casing 14 is used as a part of the circulatory line, the circulatory line is directly connected to the main body inlet 13i of the compressor casing 13. Further, in the present embodiment, if the boiler casing 31 is used as a part of the circulatory line, the circulatory line is directly connected to the turbine outlet 17o. Further, in the present embodiment, the exhausted heat recovery boiler 30 may not be present. In this case, the turbine outlet 17o is directly connected to the intake inlet 14i of the intake casing 14 or the main body inlet 13i of the compressor casing 13 by the circulatory line.

Further, the working medium of the present embodiment may be air instead of the low boiling point medium. However, in the present embodiment, in a case where air is used as the working medium, the merit of using the low boiling point medium as the working medium cannot be obtained. However, in the present embodiment, the compressor 11 draws in the high-temperature working medium exhausted from the turbine 15, and thus release of the high-temperature working medium exhausted from the turbine 15 into the atmosphere can be curbed. For this reason, in the present embodiment, in the case where air is used as the working medium, for example, a heat island phenomenon, which is at issue at present and is caused by, for instance, exhausted heat from an outdoor unit for building air-conditioning, can be curbed.

Figure 7:
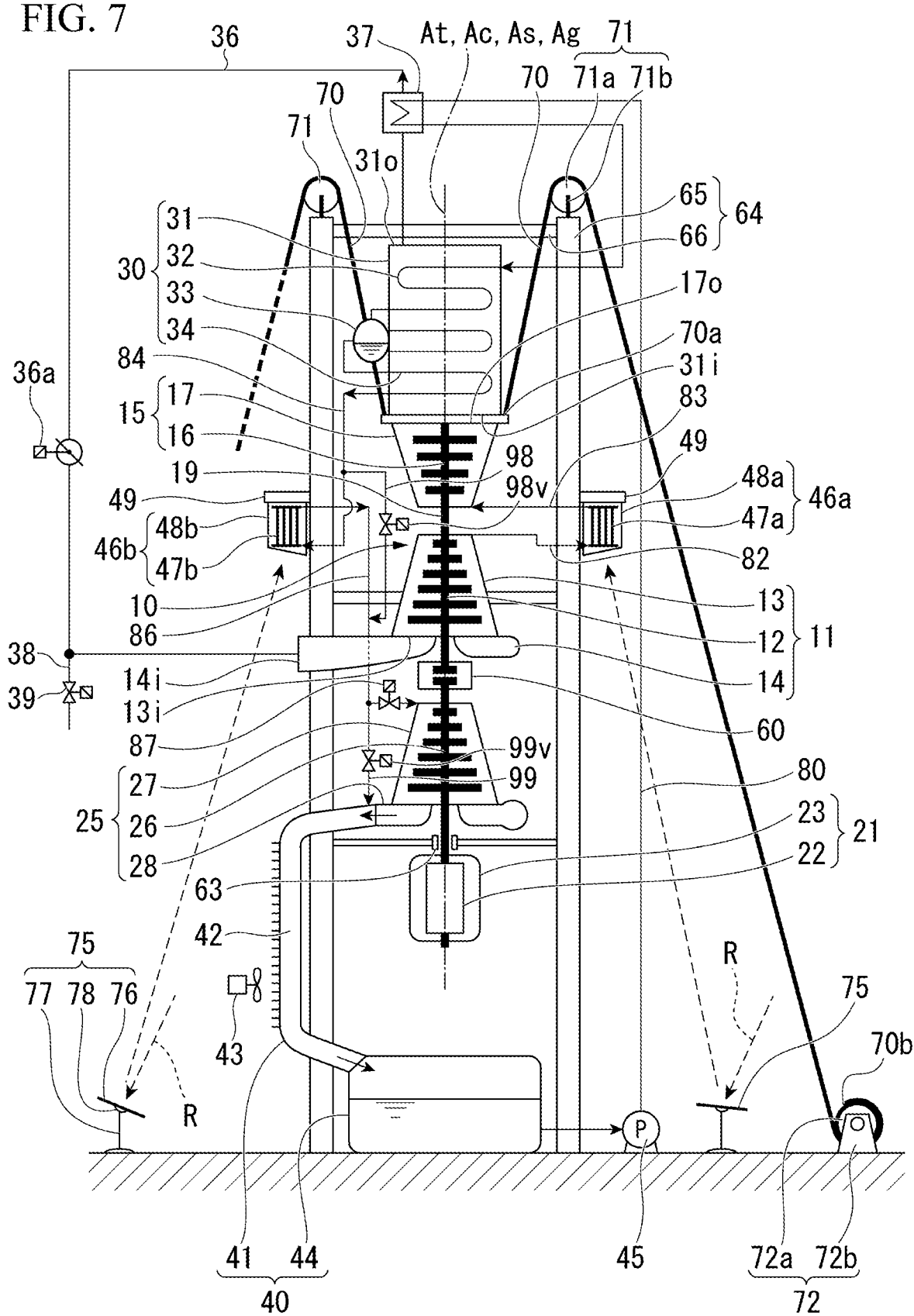
FIG. 7 is an explanatory diagram illustrating a constitution of a solar thermal power generation facility in a modification of the fifth embodiment according to the present invention.

Further, as illustrated in FIG. 7, as a modification of the present embodiment, a fed water preheater 37 may be added to the solar thermal power generation facility of the present embodiment. The fed water preheater 37 exchanges heat between the water flowing along the feed line 80 and the working medium flowing along the circulatory line 36, and heats the water that flows into the economizer 32 of the exhausted heat recovery boiler 30 from the feed line 80.

Further, the present embodiment is the modifications of the first embodiment. But in the second to fourth embodiments, the circulatory line may be add and the working medium may be use as the low boiling point medium similarly to the present embodiment.

Further, in the present embodiment, the second to fourth embodiments are the modifications of the first embodiment, but may also add the circulatory line as in the present embodiment, and use the working medium as the low boiling point medium.

Modifications

Any of the solar thermal power generation facilities of the above embodiments includes the steam superheating heat receiver 46b. However, the steam superheating heat receiver 46b may be omitted. Further, the solar thermal power generation facility of the second embodiment includes the fed water preheating heat receiver 46c. However, the fed water preheating heat receiver 46c may be omitted.

Any of the steam condensers 40 of the above embodiments is an air-cooled type. However, the steam condensers may be a water-cooled type.

Like the exhausted heat recovery boiler 30 of the second embodiment, the exhausted heat recovery boiler 30 of each of the first, third, fourth, and fifth embodiments may have the medium preheater 35.

In each of the above embodiments, the gas turbine axis At, the steam turbine axis As, and the power generator axis Ag are located on the same straight line. However, for example, in a case where a clutch or a gearbox is provided between the gas turbine rotor 19 and the power generator rotor 22, or in a case where a clutch or a gearbox is provided between the steam turbine 25 and the power generator rotor 22, the axes are parallel to each other, but may be located on the same straight line. For this reason, the axes may be located on the same straight line as long as the axes extend in the vertical direction and are parallel to each other.

In each of the above embodiments, the first ends 70a of the hanging wires 70 are connected to the turbine casing 17. However, according to the arrangement of the devices, the first ends 70a of the hanging wires 70 may be connected to any one of the compressor casing 13, the steam turbine casing 27, and the power generator casing 23. Further, the first ends 70a of the plurality of hanging wires 70 may be connected to any one of the turbine casing 17, the compressor casing 13, the steam turbine casing 27, and the power generator casing 23, and the first ends of the plurality of second hanging wires may be connected to one of the other casings, and the turbine 15 or the steam turbine 25 may be hung on the plurality of first hanging wires 70 and the plurality of second hanging wires in cooperation. Further, in each of the above embodiments, the gas turbine 10 or the like is supported to be hung from the tower 64 or 64a using the hanging wires 70. However, since the use of the hanging wires 70 is a method made mainly in consideration of inspection or repair, the gas turbine 10 or the like may be supported by another method as long as the gas turbine 10 or the like can be supported by the tower 64 or 64a. For example, the brackets may be fixed to the tower 64 or 64a, and the gas turbine 10 may be mounted on the brackets.

INDUSTRIAL APPLICABILITY

According to an aspect of the present invention, an area occupied by the tower can be reduced, and installation costs of the tower can be reduced.

REFERENCE SIGNS LIST

10 Gas turbine
11 Compressor
12 Compressor rotor
13 Compressor casing
13i Main body inlet
14 Intake casing
14i Intake inlet
15 Turbine
16 Turbine rotor
17 Turbine casing
17o Turbine outlet
19 Gas turbine rotor
21 Power generator
22 Power generator rotor
23 Power generator casing
25 Steam turbine
26 Steam turbine rotor
27 Steam turbine casing
28 Exhaust casing
30, 30a Exhausted heat recovery boiler
31 Boiler casing
31i Boiler inlet
31o Boiler outlet
32 Economizer
33 Evaporator
34 Superheater
35 Medium preheater
36 Circulatory line
36a Pressure regulating mechanism
37 Fed water preheater
38 Medium replenishment line
39 Medium replenishing valve
40 Steam condenser
41 Heat radiator
42 Finned heat transfer pipe
43 Fan
44 Water storage
45 Feed pump
46a Medium heating heat receiver
47a Heat transfer pipe
48a Heat receiver casing
49 Bracket
46b Steam superheating heat receiver
47b Heat transfer pipe 48b Heat receiver casing
46c Fed water preheating heat receiver
47c Heat transfer pipe
48c Heat receiver casing
50a High-temperature heat accumulator
51a Steam heat transfer pipe
52 Heat accumulation material
53a High-temperature heat accumulation casing
54a High-temperature heat-accumulation-material pump
50b Low-temperature heat accumulator
51b Steam heat transfer pipe
53b Low-temperature heat accumulation casing
54b Low-temperature heat-accumulation-material pump
55, 55a Steam generator
56 Heat-accumulation-material heat transfer pipe
57 Steam generation casing
58a First heat transfer pipe
58b Second heat transfer pipe
59 Steam drum
60 Clutch
61 First clutch
62 Second clutch
63 Radial bearing
64, 64a Tower
65 Post
66 Girder
67 First structure
68 Second structure
69 Heat insulator
70 Hanging wire
70a First end
70b Second end
71 Wire support machine
71a Support roller
71b Roller support machine
72 Winding machine
72a Winding drum
72b Drum support machine
75 Heliostat
76 Reflector
77 Support leg
78 Mirror driving machine
80 Feed line
81 Fed water regulating valve
82 Compressed air line
83 Heated air line
84 First main steam line
85 Second main steam regulating valve
86 Second main steam line
87 Main steam regulating valve (first main steam regulating valve)
88 Auxiliary feed line
89 Auxiliary fed-water regulating valve
91 Auxiliary steam line
92a High-temperature steam line
92b Low-temperature steam line
93 High-temperature steam regulating valve
93b Low-temperature steam regulating valve
94a High-temperature steam exhaust line
94b Low-temperature steam exhaust line
95 High-temperature heat-accumulation-material supply line
96 High-temperature heat-accumulation-material discharge line
97 Low-temperature heat-accumulation-material supply line
98 Heat receiver bypass line
98v Heat receiver bypass valve
99 Steam turbine bypass line
99v Steam turbine bypass valve
R Sunlight
Ac Compressor axis
At Turbine axis
Ag Power generator axis
As Steam turbine axis
Av Virtual axis

The invention claimed is:

1. A solar thermal power generation facility comprising:
a compressor configured to compress a working medium to generate a compressed medium;
a medium heating heat receiver, which is a heat receiver, configured to receive sunlight to heat the compressed medium;
a turbine configured to be driven by the compressed medium heated by the medium heating heat receiver;
a power generator configured to generate electric power by driving the turbine;
an exhausted heat recovery boiler configured to heat water with an exhausted medium that is the working medium exhausted from the turbine and convert the water into steam;
a steam turbine configured to be driven by steam from the exhausted heat recovery boiler;
a steam condenser configured to return steam exhausted from the steam turbine to water;
a feed line configured to guide water inside the steam condenser to the exhausted heat recovery boiler;
a heat accumulation material that is capable of accumulating heat of the steam from the exhausted heat recovery boiler;
an auxiliary feed line that branches off from the feed line;
a steam generator that is connected to the auxiliary feed line, has a heat transfer pipe that is in contact with the heat accumulation material and is capable of exchanging heat between the water from the auxiliary feed line and the heat accumulation material, is configured to heat the water by the heat accumulation material, and is configured to convert the water into steam;
an auxiliary steam line configured to guide the steam generated by the steam generator to the steam turbine; and
a tower configured to support the compressor, the medium heating heat receiver, the turbine, and the power generator,
wherein the compressor has a compressor rotor that is rotated about a compressor axis extending in a vertical direction, and a compressor casing that covers the compressor rotor,
the turbine has a turbine rotor that is rotated about a turbine axis extending in the vertical direction, and a turbine casing that covers the turbine rotor,
the compressor rotor and the turbine rotor are mechanically connected to constitute a gas turbine rotor,
the power generator has a power generator rotor that is mechanically connected to the gas turbine rotor and is rotated about a power generator axis extending in the vertical direction, and a power generator casing that covers the power generator rotor,
the compressor, the turbine, and the power generator are formed as arranged devices, and
a plurality of the arranged devices are aligned in the vertical direction.

2. The solar thermal power generation facility according to claim 1, wherein:

the compressor casing has an inlet into which the working medium flows, and the turbine casing has an outlet that discharges the working medium that is the compressed medium; and the solar thermal power generation facility comprises a circulatory line configured to guide the working medium, which is discharged from the outlet of the turbine casing, from the inlet of the compressor casing into the compressor casing.

3. The solar thermal power generation facility according to claim 1, wherein:

the compressor casing has an inlet into which the working medium flows, and the exhausted heat recovery boiler has a discharge port that discharges the working medium that is the exhausted medium; and the solar thermal power generation facility comprises a circulatory line configured to guide the working medium, which is discharged from the discharge port of the exhausted heat recovery boiler, from the inlet of the compressor casing into the compressor casing.

4. The solar thermal power generation facility according to claim 2, comprising a pressure regulating mechanism provided on the circulatory line and configured to regulate a pressure inside the circulatory line.

5. The solar thermal power generation facility according to claim 1, wherein:

the exhausted heat recovery boiler is formed as an arranged device; and the plurality of arranged devices including the exhausted heat recovery boiler are aligned in the vertical direction.

6. The solar thermal power generation facility according to claim 1, wherein:

the steam turbine has a steam turbine rotor that is rotated about a steam turbine axis extending in the vertical direction, and a steam turbine casing that covers the steam turbine rotor;

the steam turbine is formed as an arranged device; and the plurality of arranged devices including the steam turbine are aligned in the vertical direction.

7. The solar thermal power generation facility according to claim 6, wherein:

the steam turbine rotor is mechanically connected to the power generator rotor; and the solar thermal power generation facility comprises a clutch configured to switch a connected state between the gas turbine rotor and the power generator rotor between a transmitted state in which motive power transmission is possible and an untransmitted state in which motive power transmission is not conducted between the gas turbine rotor and the power generator rotor.

8. The solar thermal power generation facility according to claim 7, wherein:

the compressor and the turbine are disposed on one of an upper side in the vertical direction and a lower side in the vertical direction on the basis of the power generator;

the steam turbine is disposed on the other of the upper side in the vertical direction and the lower side in the vertical direction on the basis of the power generator; and the solar thermal power generation facility comprises a clutch configured to switch a connected state between the steam turbine rotor and the power generator rotor between a transmitted state in which motive power transmission is possible and an untransmitted state in which motive power transmission is not conducted between the steam turbine rotor and the power generator rotor.

9. The solar thermal power generation facility according to claim 1, wherein:

the steam condenser has a water storage in which, after the steam exhausted from the steam turbine is returned to the water, the water is capable of being stored;

the water storage is formed as an arranged device; and the plurality of arranged devices including the water storage are aligned in the vertical direction.

10. The solar thermal power generation facility according to claim 1, wherein:

the turbine is disposed above the compressor; and the exhausted heat recovery boiler is disposed above the turbine.

11. The solar thermal power generation facility according to claim 1, wherein:

the tower has a plurality of structures for supporting the arranged devices; and one of the plurality of structures is formed of the heat accumulation material.

12. The solar thermal power generation facility according to claim 1, comprising heliostats, each of which has a reflector that reflects sunlight and a mirror driving machine that changes a direction of the reflector such that the sunlight reflected by the reflector is directed to the heat receiver.

13. A solar thermal power generation facility comprising:

a compressor configured to compress a working medium to generate a compressed medium;

a medium heating heat receiver, which is a heat receiver, configured to receive sunlight to heat the compressed medium;

a turbine configured to be driven by the compressed medium heated by the medium heating heat receiver;

a power generator configured to generate electric power by driving the turbine;

an exhausted heat recovery boiler configured to heat water with an exhausted medium that is the working medium exhausted from the turbine and convert the water into steam;

a steam turbine configured to be driven by steam from the exhausted heat recovery boiler;

a steam condenser configured to return steam exhausted from the steam turbine to water; and a feed line configured to guide water inside the steam condenser to the exhausted heat recovery boiler;

a heat accumulator has a heat accumulation material that is capable of accumulating heat of the steam from the exhausted heat recovery boiler and has fluidity;

an auxiliary feed line that branches off from the feed line;

a steam generator that is connected to the auxiliary feed line, is configured to heat the water from the auxiliary feed line, and is configured to convert the water into steam;

an auxiliary steam line configured to guide the steam generated by the steam generator to the steam turbine; and a heat-accumulation-material supply line which connects the heat accumulator and the steam generator to each other and along which the heat accumulation material from the heat accumulator is capable of flowing; and a tower configured to support the compressor, the medium heating heat receiver, the turbine, and the power generator, wherein the heat accumulator has a steam heat transfer pipe along which the steam from the exhausted heat recovery boiler is capable of flowing, and a heat accumulation casing that accommodates the heat accumulation material and the steam heat transfer pipe, and the steam generator has a heat-accumulation-material heat transfer pipe that is connected to the heat-accumulation-material supply line and along which the heat accumulation material from the heat-accumulation-material supply line is capable of flowing, and a steam generation casing that is connected to the auxiliary feed line, is configured to collect water from the auxiliary feed line, and covers the heat-accumulation-material heat transfer pipe, the compressor has a compressor rotor that is rotated about a compressor axis extending in a vertical direction, and a compressor casing that covers the compressor rotor, the turbine has a turbine rotor that is rotated about a turbine axis extending in the vertical direction, and a turbine casing that covers the turbine rotor, the compressor rotor and the turbine rotor are mechanically connected to constitute a gas turbine rotor, the power generator has a power generator rotor that is mechanically connected to the gas turbine rotor and is rotated about a power generator axis extending in the vertical direction, and a power generator casing that covers the power generator rotor, the compressor, the turbine, and the power generator are formed as arranged devices, and a plurality of the arranged devices are aligned in the vertical direction.

14. The solar thermal power generation facility according to claim 13, wherein:

the heat accumulator is formed as an arranged device; and the plurality of arranged devices including the heat accumulator are aligned in the vertical direction.

15. The solar thermal power generation facility according to claim 14, wherein:

the heat accumulator has a first heat accumulator and a second heat accumulator; and the first heat accumulator and the second heat accumulator are aligned in the vertical direction.

* * * * *